US009036175B2

(12) United States Patent
Sugiyama

(10) Patent No.: US 9,036,175 B2
(45) Date of Patent: May 19, 2015

(54) PRINTER CAPABLE OF AUTHENTICATING USER, PRINT MANAGEMENT SYSTEM INCLUDING THE PRINTER AND COMPUTER READABLE DEVICE STORING USER AUTHENTICATION PROGRAM

(75) Inventor: Takashi Sugiyama, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 129 days.

(21) Appl. No.: 13/354,125

(22) Filed: Jan. 19, 2012

(65) Prior Publication Data

US 2012/0192264 A1 Jul. 26, 2012

(30) Foreign Application Priority Data

Jan. 21, 2011 (JP) ................................ 2011-011199
Oct. 31, 2011 (JP) ................................ 2011-239750

(51) Int. Cl.

*G06K 15/00* (2006.01)
*G03G 15/00* (2006.01)
*G03G 21/02* (2006.01)
*G06F 3/00* (2006.01)
*G06F 7/04* (2006.01)

(52) U.S. Cl.

CPC ............ *G03G 15/5091* (2013.01); *G03G 21/02* (2013.01); *G03G 2215/00088* (2013.01)

(58) Field of Classification Search

CPC .......................... G03G 15/5091; G03G 21/02
See application file for complete search history.

(56) References Cited

U.S. PATENT DOCUMENTS

2007/0283447 A1 12/2007 Hong et al.
2008/0239357 A1 10/2008 Matsushima
2010/0157343 A1 6/2010 Uchida
2010/0235888 A1* 9/2010 Miyamoto ........................ 726/4
2010/0325716 A1* 12/2010 Hong et al. ....................... 726/9

FOREIGN PATENT DOCUMENTS

CN 101416145 A 4/2009
EP 1865437 A2 * 12/2007

(Continued)

OTHER PUBLICATIONS

European Patent Office, extended European Search Report for European Patent Application No. 12151486.3 (counterpart to above-captioned patent application), dated May 7, 2012.

(Continued)

*Primary Examiner* — Ashish K Thomas
*Assistant Examiner* — Neil R McLean
(74) *Attorney, Agent, or Firm* — Merchant & Gould PC

(57) ABSTRACT

In a printing apparatus, a controller authenticates a user with using first authentication information, and printing is allowed according to successful authentication using the first authentication information and printing is prohibited according to failed authentication using the first authentication information. The controller determines whether an authentication request condition is satisfied, and according to determination that the authentication information request condition is satisfied, the controller requests a user to input second authentication information and authenticates the user with using the second authentication information. Printing is allowed according to successful authentication using the second authentication information, and printing is prohibited according to failed authentication using the second authentication.

16 Claims, 23 Drawing Sheets

(56) References Cited

FOREIGN PATENT DOCUMENTS

| | | | |
|---|---|---|---|
| JP | H01-250967 | A | 10/1989 |
| JP | 2004-362356 | A | 12/2004 |
| JP | 2006-163044 | A | 6/2006 |
| WO | 2007/114403 | A1 | 10/2007 |

OTHER PUBLICATIONS

Chinese Office Action issued in application No. 201210017848.6, mailed Feb. 20, 2014.

Office Action issued in related European application No. 12 151 486.3, Apr. 7, 2015.

* cited by examiner

| USER ID | CARD NUMBER | PASSWORD | LIMIT NUMBER OF PRINT PAGES | PRINTED PAGE COUNTER | LAST AUTHENTICATION TIME |
|---|---|---|---|---|---|
| User01 | 1000 | 12345678 | 1000 | 314 | DECEMBER 20, 2010, 13:29:14 |
| User02 | 1001 | abcdefgh | 2000 | 444 | DECEMBER 6, 2010, 9:12:43 |
| User03 | 1002 | 1234abcd | 2000 | 1053 | DECEMBER 15, 2010, 20:08:27 |
| User04 | 1003 | abcd1234 | 1000 | 314 | DECEMBER 18, 2010, 16:47:32 |
| User05 | 1004 | 5678fghi | 900 | 688 | DECEMBER 22, 2010, 10:38:16 |

FIG. 2

USER MANAGEMENT TABLE (1)

| USER ID | CARD NUMBER | | LAST AUTHENTICATION TIME |
|---|---|---|---|
| User01 | 1000 | | DECEMBER 20, 2010, 13:29:14 |
| User02 | 1001 | | DECEMBER 6, 2010, 9:12:43 |
| User03 | 1002 | | DECEMBER 15, 2010, 20:08:27 |
| User04 | 1003 | | DECEMBER 18, 2010, 16:47:32 |
| User05 | 1004 | | DECEMBER 22, 2010, 10:38:16 |

USER MANAGEMENT TABLE (2)

| USER ID | PASSWORD |
|---|---|
| User01 | 12345678 |
| User02 | abcdefgh |
| User03 | 1234abcd |
| User04 | abcd1234 |
| User05 | 5678fghi |

PRINTER CAPABLE OF AUTHENTICATING USER, PRINT MANAGEMENT SYSTEM INCLUDING THE PRINTER AND COMPUTER READABLE DEVICE STORING USER AUTHENTICATION PROGRAM

CROSS REFERENCE TO RELATED APPLICATION

The present application claims priority from Japanese Patent Application Nos. 2011-011199 filed on Jan. 21, 2011 and 2011-239750 filed on Oct. 31, 2011, which are incorporated herein by reference.

TECHNICAL FIELD

The present disclosure relates to a technique for allowing an authenticated user to execute printing operation.

BACKGROUND

It is known that an image forming apparatus reads a personal information identifier (credentials) from a noncontact ID card to execute personal authentication. In such an image forming apparatus, if the personal authentication is successful, the printing operation is allowed to be executed.

SUMMARY

However, in such an image forming apparatus, the noncontact ID card may be stolen and printing operation may be executed by unauthorized use of the stolen ID card.

According to the following illustrative aspects, unauthorized printing that may occur if authentication information is leaked is less likely to be caused.

A printing apparatus according to an aspect of the present invention includes a printing unit configured to print an image, an input reception unit configured to receive input of first authentication information and second authentication information from a user, and a controller. The controller is configured to execute a first authentication process to authenticate a user with using the first authentication information that is received by the input reception unit, determine whether an authentication cancel condition for canceling authentication of a user is satisfied, execute a first print control process to allow the printing unit to execute a printing operation according to successful authentication of a user in the first authentication process until determining that the authentication cancel condition is satisfied, and to prohibit the printing unit from executing the printing operation according to a failed authentication of a user in the first authentication process, execute a first request condition determination process to determine whether an authentication request condition is satisfied, the authentication request condition requesting input of the second authentication information to a user who is authenticated in the first authentication process and for whom it is determined that the authentication cancel condition is not satisfied, execute a second authentication process according to determination that the authentication information request condition is satisfied in the first request condition determination process, the second authentication process including controlling the input request unit to request the user to input the second authentication information, and authenticating the user with using the second authentication information received by the input reception unit, and execute a second print control process to allow the printing unit to execute a printing operation according to successful authentication of the user in the second authentication process and prohibit the printing unit from executing a printing operation according to failed authentication of the user in the second authentication process.

BRIEF DESCRIPTION OF THE DRAWINGS

FIG. 2 is a typical view illustrating an example of a user management table;

DETAILED DESCRIPTION OF THE ILLUSTRATIVE ASPECTS

<First Illustrative Aspect>

A first illustrative aspect will be hereinafter explained with reference to FIGS. 1 to 10.

(1) Electrical Construction of Multifunctional Apparatus

Figure 1:
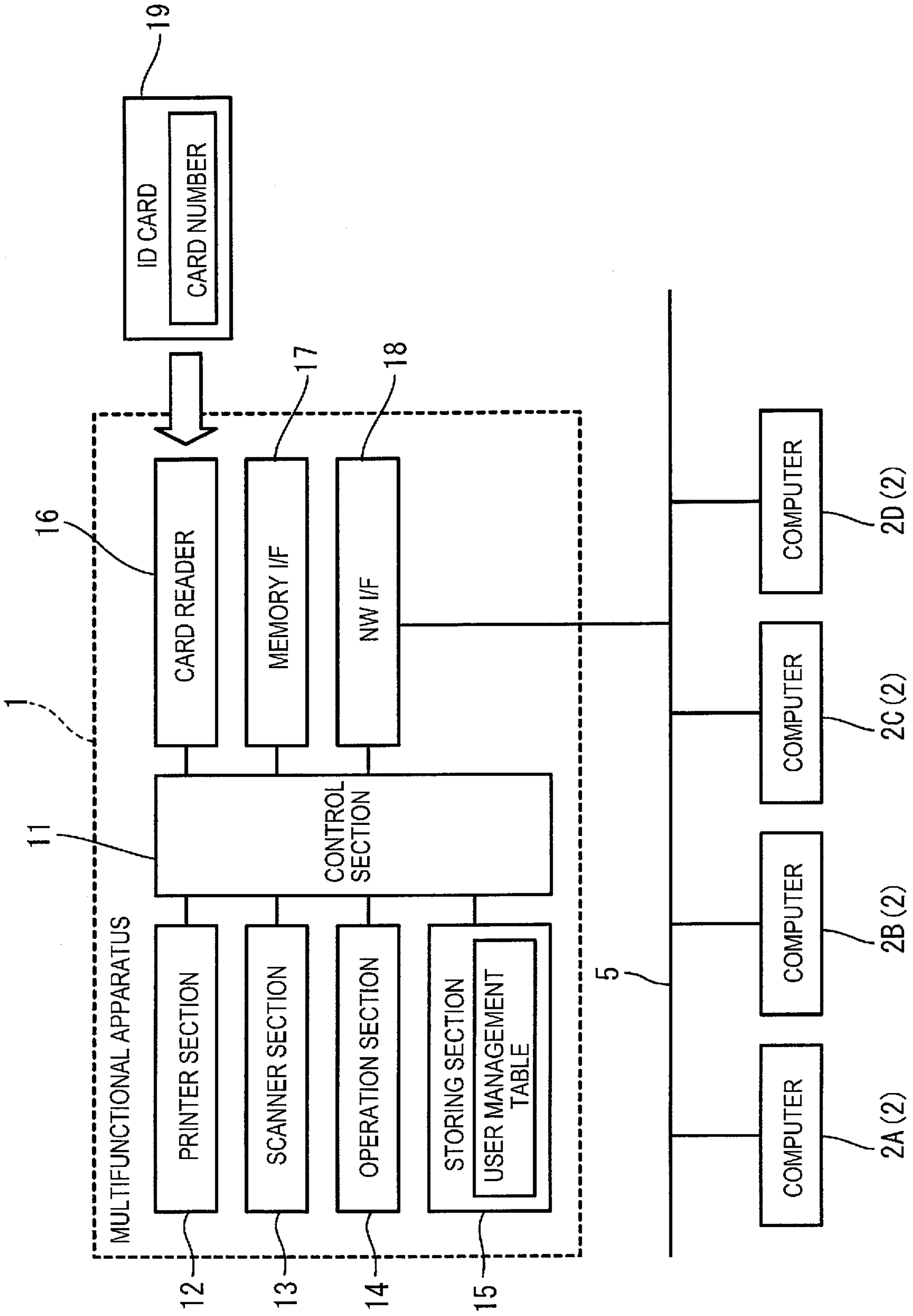
FIG. 1 is a block diagram illustrating an electrical structure of a multifunctional apparatus according to a first illustrative aspect.

An electric construction of a multifunctional apparatus 1 having functions of a scanner, a printer, a copier will be explained with reference to FIG. 1. The multifunctional apparatus 1 is an example of a printing apparatus. The multifunctional apparatus 1 is configured by a control section 11, a printer section 12, a scanner section 13, an operation section 14, a storing section 15, a card reader 16, a memory interface (memory I/F) 17, and a network interface (NW I/F) 18.

The control section 11 (an example of a control unit) is configured by a CPU, a ROM, a RAM and a timer. The CPU executes various programs stored in the ROM or the storing section 15 to control each section of the multifunctional apparatus 1. The ROM stores various programs that are to be executed by the CPU and data. The RAM is known as a main memory that is used when the CPU executes various processes. The timer is used for obtaining current time or measuring a process time period.

The printer section 12 is an example of a printing unit. The printer section 12 prints an image represented by print data (hereinafter, simply referred to as print data) on a recording medium such as a paper or an OHP sheet (print resources) by an electrophotographic printing method or an ink jet printing method.

The scanner section 13 includes a document tray on which a document is placed, a transfer section that transfers the document on the document tray one page by one, a light source for irradiating a document, and a linear image sensor. The scanner section 13 reads an image of a document that is transferred by the transfer section and generates image data.

The operation section 14 is an example of an input reception unit and an input request unit. The operation section 14 is configured by a display 14A (see FIG. 5) such as an LCD (liquid crystal display) and various operation buttons 14B (see FIG. 5). A user operates the operation section 14 to execute various operations such as instructing a printing operation and inputting a password.

The storing section 15 stores various data therein with using nonvolatile memories such as a hard disk and a flash memory.

The card reader 16 reads a card number stored in an ID card 19 by noncontact communication and transmits the card number to the control section 11. The card reader 16 is an example of the input reception unit.

The ID card 19 may be a magnetic card or an IC card. Instead of such kinds of cards, a removable memory such as a USB memory or a card with a bar code may be used.

The memory interface (memory I/F) 17 is configured as a USB host interface or a memory card reader. A USB mass storage device such as a USB memory and a USB hard disk is connected to the USB host interface, and the memory card reader includes a memory slot that corresponds to a standard of various removable memories.

The network interface (NW I/F) 18 is connected to external computers such as a personal computer, a handheld terminal, a portable phone via a communication network 5 such as an LAN or an internet so as to establish communication.

(2) State of Multifunctional Apparatus

The multifunctional apparatus 1 can be set in one of a print allowable state and a print prohibited state. A printing operation by the printer section 12 is allowed in the print allowable state, and a printing operation by the printer section 12 is prohibited in the print prohibited state.

The multifunctional apparatus 1 is normally in the print prohibited state. If a user is authenticated in the print prohibited state, the multifunctional apparatus 1 becomes in the print allowable state. After a user is authenticated, the print allowable state is kept until a predetermined authentication cancel condition is satisfied (an example of a first print control process). If the predetermined authentication cancel condition is satisfied, the multifunctional apparatus 1 is returned to be in the print prohibited state (an example of the first print control process).

In the first illustrative aspect, a user can instruct a printing operation only once in the print allowable state. After completion of the printing operation, it is recognized that the authentication cancel condition is satisfied and the multifunctional apparatus 1 is returned to be in the print prohibited state.

(3) Functions of Multifunctional Apparatus

The multifunctional apparatus 1 has a PC printing function, a copying function and a direct printing function.

In the PC printing function, the multifunctional apparatus 1 receives print data from an external computer 2 via the communication network 5 and prints the received print data.

In using the PC printing function, a user transmits print data from the external computer 2 to the multifunctional apparatus 1, and then, a user passes the ID card 19 over the card reader 16 of the multifunctional apparatus 1 to authenticate the user. If the authentication is successful, the multifunctional apparatus 1 is set in the print allowable state. If a user operates the operation section 14 to instruct a printing operation in the print allowable state, the printing operation of the print data that is transmitted from the external computer 2 is started. On the other hand, if the authentication is failed and the authentication is not successful within a predetermined time period after the failure, the transmitted print data is deleted from the multifunctional apparatus 1.

In the copying function, the multifunctional apparatus 1 reads a document placed on the document tray and generates print data and prints the generated print data.

In using the copying function, a user passes the ID card over the card reader 16 of the multifunctional apparatus 1 to authenticate the user. If the authentication is successful, the multifunctional apparatus 1 is set in the print allowable state. If a user operates the operation section 14 to instruct the copying operation in the print allowable state, copying of the document is started.

In the direct printing function, the multifunctional apparatus 1 reads the image data that is specified by a user among the image data stored in the removable memory that is mounted to the memory interface 17. Then, the multifunctional apparatus 1 generates print data based on the read image data and prints the generated print data.

In using the direct printing function, a user passes the ID card 19 over the card reader 16 of the multifunctional apparatus 1 to authenticate the user. If the authentication is successful, the multifunctional apparatus 1 is set in the print allowable state and image data can be specified. If a user specifies image data in the print allowable state to instruct direct printing, print data is generated based on the specified image data and printing is started.

(4) User Management Table

A user management table that is stored in the storing section 15 will be explained with reference to FIG. 2. The user management table is used for managing the accumulated number of printed pages for each user. User IDs, card numbers (an example of first authentication information), passwords (an example of second authentication information), a limit number of print pages (an example of a limit value), a printed page counter (an example of a value that is counted by the counting process) and last authentication time are registered in the user management table. One example of the last authentication time is represented by "Dec. 20, 2011, 13:29:14" in FIG. 2 (also in FIGS. 13 and 16) and this means that the last authentication is made at 13:29:14 on Dec. 20, 2011.

The limit number of print pages is a maximum number of recording medium that can be printed by the multifunctional apparatus 1 for the user who is authenticated by the user ID. As illustrated in FIG. 2, a value that is different for every user ID can be set to the limit number of print pages.

The printed page counter represents an accumulated number of recording medium having print data thereon that is printed by the multifunctional apparatus 1 for each user. The printed page counter is prepared for every user.

The last authentication time represents time when last user authentication is made. In this illustrative aspect, authentication using a password (second authentication information) is executed. The time when last user authentication using a password is made is registered in the last authentication time.

In this illustrative aspect, authentication using a card number (first authentication information) is also executed. Details thereof will be described later. The time when user authentication using a card number or a password which is the latest one may be registered in the last authentication time. Only the time when the authentication is made using a card number may be registered in the last authentication time.

(5) Processes of Multifunctional Apparatus

The multifunctional apparatus 1 is configured to execute a user registration process, a user authentication process, a printing process, an increasing process for forcibly increasing a number of print pages and a request process for forcibly requesting a password.

In the user registration process, a user is registered in the user management table.

The user registration process is executed when a user passes the ID card 19 over the card reader 16 to use the PC print function, the copying function or the direct print function. In the user registration process, user authentication is made with using a card number that is output from the card reader 16 and if the authentication is successful, the multifunctional apparatus 1 is set in the print allowable state.

The printing process is started when the multifunctional apparatus 1 is set in the print allowable state. In the printing process, if a print instruction is received from a user, the print data is printed by the printer section 12. The print instruction is an instruction of printing in case of the PC print function, and is an instruction of copying in case of the copying function, and is an instruction of direct print in case of the direct print function.

In the increasing process for forcibly increasing a number of print pages (an example of a count value changing process), a predetermined value is forcibly added to the printed page counter every time predetermined time passes from the last authentication time. In other words, in this process, the number of remaining pages that can be used for the user's printing is decreased every predetermined time period passes from the last authentication time.

In the request process for forcibly requesting a password (an example of a forcibly changing process), a manager of the multifunctional apparatus 1 forcibly changes the printed page counter of a user to a specified number of pages. In the first illustrative aspect, the printed page counter is changed to the limit number of print pages.

A flow of each process will be explained.

(5-1) User Registration Process

Figure 3:
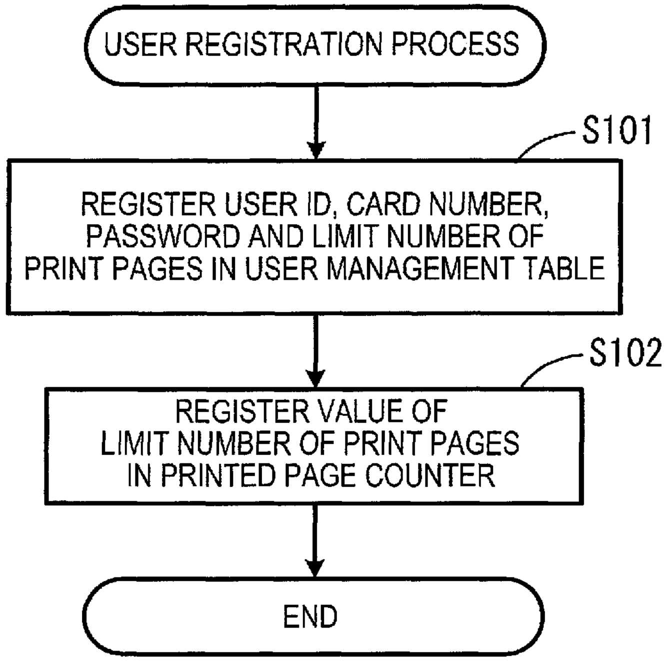
FIG. 3 is a flowchart illustrating a flow of a user registration process.

The user registration process will be explained with reference to FIG. 3. The user registration process is started if a manager of the multifunctional apparatus 1 operates the operation section 14 to instruct to register a user.

At step S101, the control section receives input of a user ID, a card number, a password and a limit number of print pages made by the manager and the input information is registered in the user management table with mutual correspondence.

At step S102, the control section 11 registers the number of pages equal to the limit number of print pages that is input at step S101 in the print page counter of the user who is registered at step S101. Namely, immediately after a user is registered in the user management table, the printed page counter reaches the limit number of print pages even if any print data is not yet printed by the multifunctional apparatus 1 according to the user's instruction.

(5-2) User Authentication Process

Figure 4:
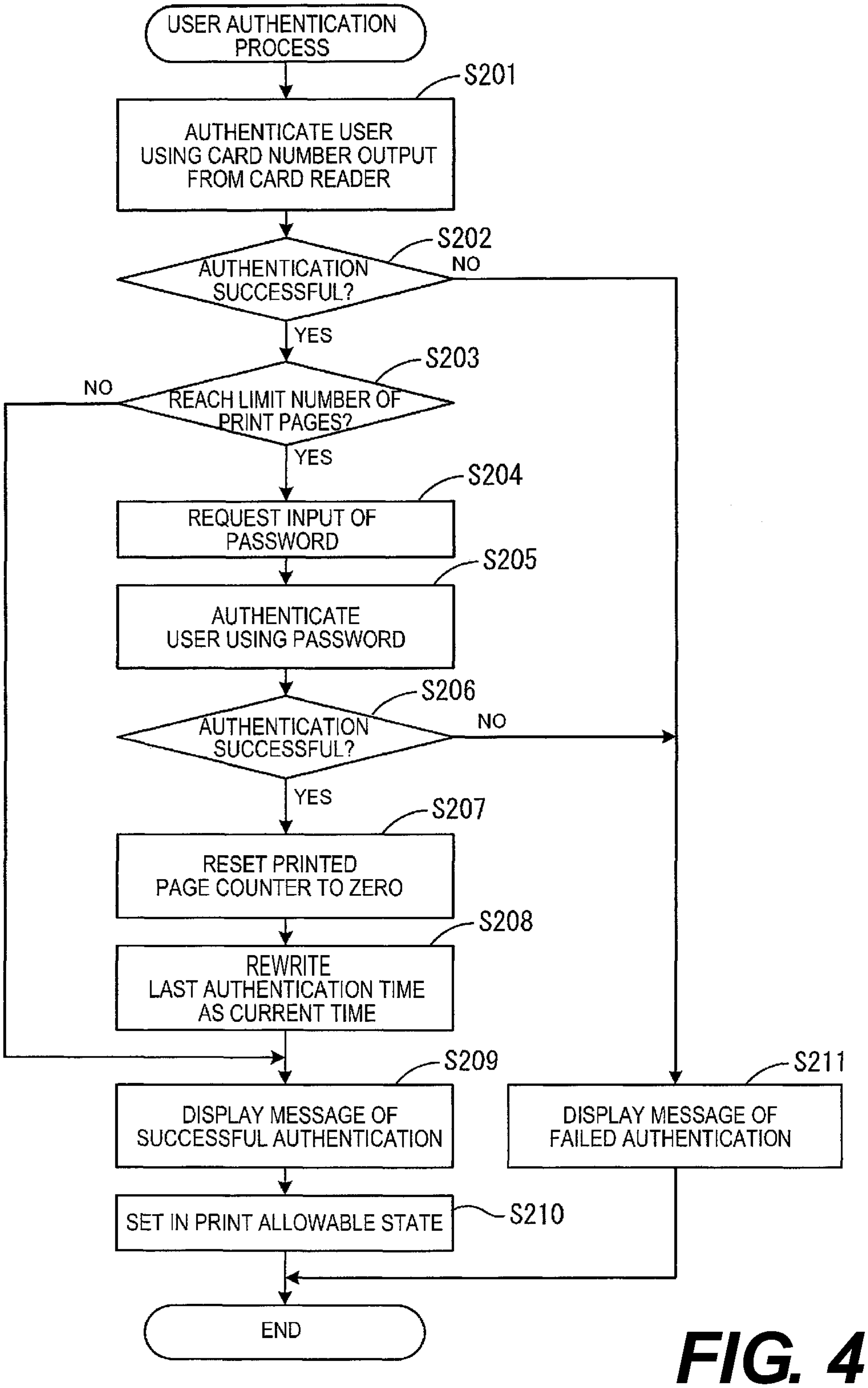
FIG. 4 is a flowchart illustrating a flow of a user authentication process.
Figure 5:
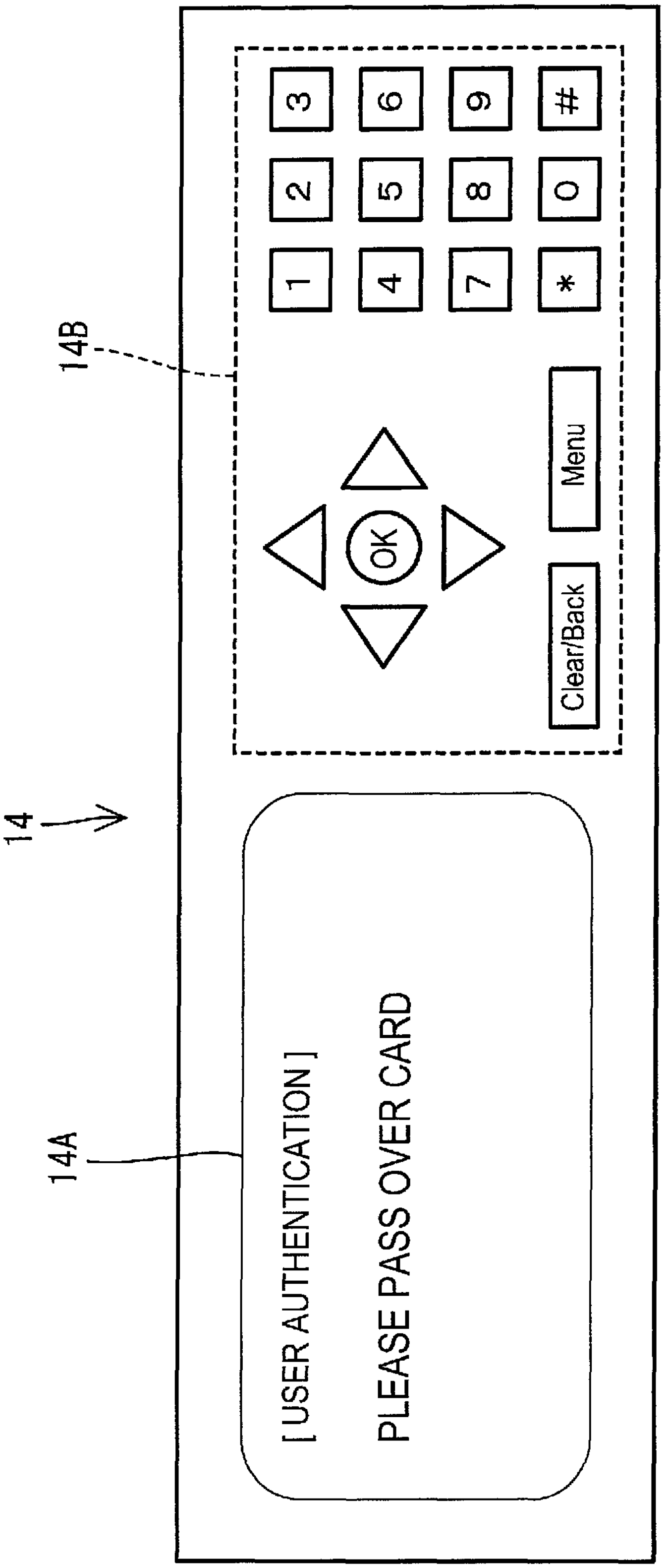
FIG. 5 is a typical view illustrating an example of a message displayed on a display.

The user authentication process will be explained with reference to FIG. 4. When the multifunctional apparatus 1 is in the print prohibited state, the control section 11 always displays on the display 14A a message that requests a user to pass the ID card 19 over the card reader 16, as illustrated in FIG. 5. If a user passes the ID card 19 over the card reader 16, the card reader 16 reads the card number and the read card number is output to the control section 11. This process is started if the card number is output to the control section 11 from the card reader 16.

At step S201, the control section 11 authenticates the user with using the card number (the first authentication information) output from the card reader 16 (an example of a first authentication process).

Specifically, the control section 11 determines whether the card number output from the card reader 16 is registered in the user management table.

If determining that the card number is registered in the user management table at step S201, the control section 11 determines that the authentication is successful at step S202 and proceeds to step S203. If determining that the card number is not registered in the user management table at step S201, the control section 11 determines that the authentication is failed and proceeds to step S211.

At step S203, the control section 11 reads from the user management table the limit number of print pages and the printed page counter that correspond to the user's card number and determines whether the printed page counter reaches the limit number of print pages.

At step S203, if determining that the printed page counter reaches the limit number of print pages, the control section 11 determines that authentication information request condition is satisfied and proceeds to step S204, and if determining that the printed page counter does not reach the limit number of print pages, the control section 11 determines that the authentication information request condition is not satisfied and proceeds to step S209.

Figure 6:
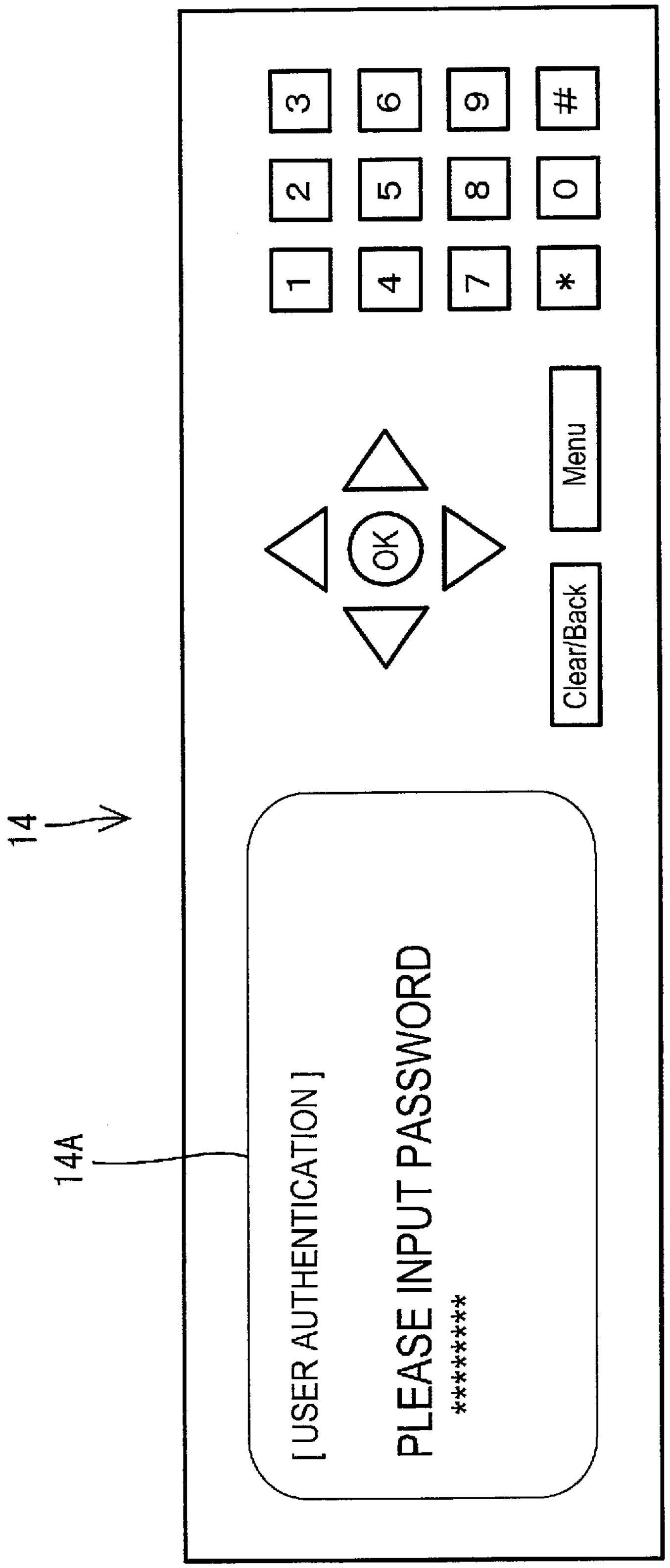
FIG. 6 is a typical view illustrating an example of a message displayed on a display.

At step S204, the control unit 11 displays on the display 14*a* a message that request input of a password, as illustrated in FIG. 6, and waits until the password is input.

Examples of users who are requested to input a password at step S204 are as follows:

(a) a user who passes the ID card 19 over the card reader 16 for the first time after his/her card number is registered in the user management table (an example of a user who has never authenticated by the first authentication process before);

(b) a user who repeated printing operations and whose printed page counter reaches the limit number of print pages;

(c) a user who does not instruct printing operations until the printed page counter actually reaches the limit number of print pages, however, whose printed page counter reaches the limit number of print pages by repeatedly adding a predetermined value to the printed page counter in the increasing process for forcibly increasing a number of print pages; and (d) a user who does not instruct printing operations until the printed page counter actually reaches the limit number of print pages, however, whose printed page counter is forcibly changed to the limit number of print pages by the manager in the request process for forcibly requesting a password.

At step S205, the control section 11 authenticates a user with using the password that is input at step S204.

Specifically, the control section 11 reads from the user management table a password that corresponds to the user's card number and determines if the password input at step S204 is identical to the password read from the user management table.

If determining that the passwords are identical at step S205, the control section 11 determines that the authentication is successful at step S206 and proceeds to S207. If determining that the passwords are not identical at step S205, the control section 11 determines that the authentication is failed at step S206 and proceeds to step S211.

At step S207, the control section 11 decreases the value of the printed page counter corresponding to the user's card number to be relatively smaller than the limit number of print pages. Specifically, the control section 11 resets the value of the printed page counter to be zero.

At step S208, the control section 11 updates the last authentication time corresponding to the card number to the current time.

Figure 7:
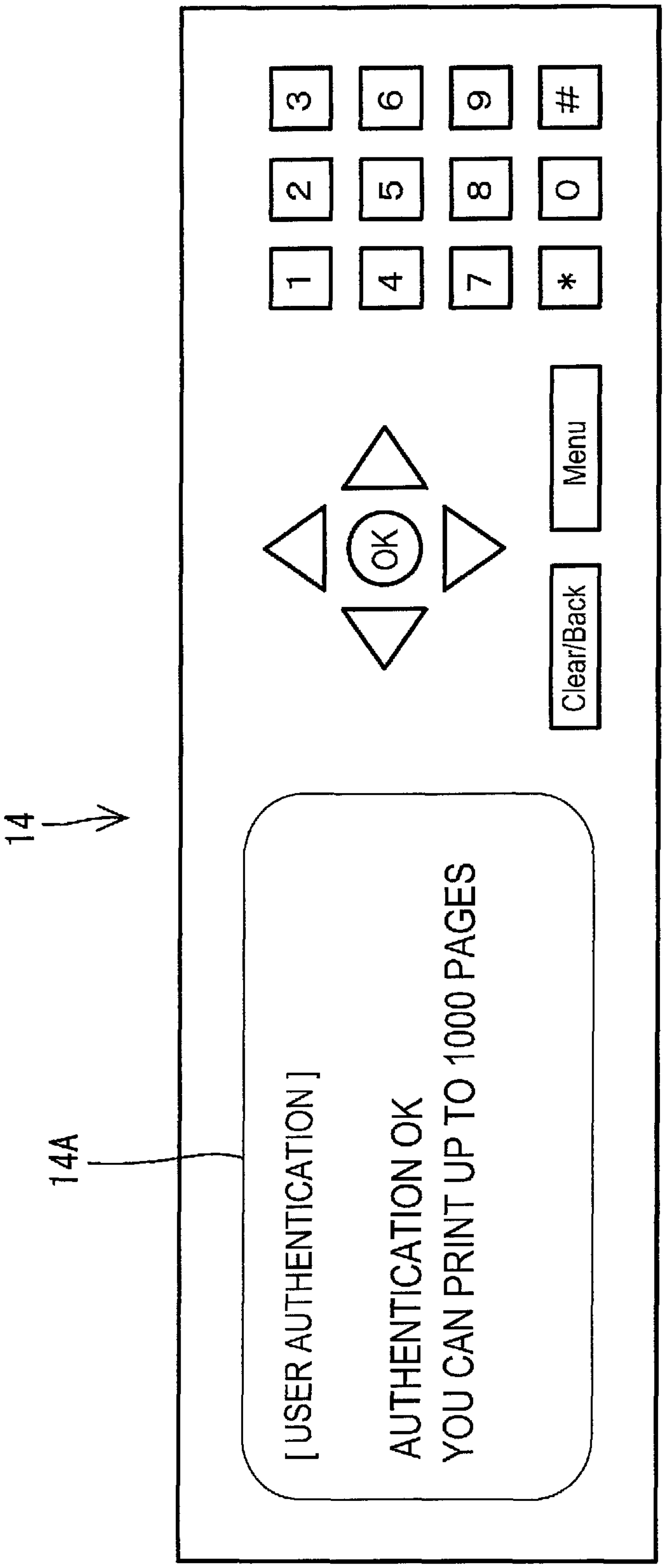
FIG. 7 is a typical view illustrating an example of a message displayed on a display.

At step S209, the control section 11 displays on the display 14*a* a message that indicates that the authentication is successful as illustrated in FIG. 7. As illustrated in FIG. 7, the message indicating that the authentication is successful also indicates the number of pages that can be printed by the user (=the limit number of print pages—the printed page counter).

At step 210, the control section 11 sets the multifunctional apparatus to be in the print allowable state (an example of the first print control process and an example of the second print control process).

At step S211, the control section 11 displays on the display 14*a* a message indicating that the authentication is failed and terminates the process.

If determining that the authentication is failed, the control section 11 does not set the multifunctional apparatus 1 in the print allowable state, and therefore the multifunctional apparatus 1 is kept in the print prohibited state (an example of the first print control process and an example of the second print control process).

(5-3) Printing Process

The printing process will be explained with reference to FIG. 8. The printing process is started if the authentication is successful in the user authentication process and the multifunctional apparatus 1 is set in the print allowable state.

The printing process of the copying function will be explained as one example. In this example, a plurality of documents is to be copied. The flow of the printing process of the PC print function or the direct print function is substantially same as that of the copying function.

At step S301, the control section 11 waits until a printing operation is instructed by the user, and if a printing operation is instructed, the process proceeds to step S302.

At step S302, the control section 11 reads one page of a document and generates print data of the one page and controls the printer section 12 to print the generated print data.

At step S303, the control section 11 increases the printed page counter corresponding to the user's card number by one (an example of a counting process).

At step S304, the control section 11 determines whether the printing operation of all pages is completed and if determining that the printing operation of all pages is not completed, the control section 11 proceeds to step S305. If determining that the printing operation of all pages is completed, the control section 11 determines that the authentication cancel condition is satisfied and proceeds to step S313. At step S313, the control section 11 sets the multifunctional apparatus 1 to be in the print prohibited state and terminates the process.

At step S305, the control section 11 determines whether a predetermined authentication information request condition that requests input of a password (second authentication information) is satisfied for a user whom the authentication cancel condition (an example of a first request condition determination process) is not satisfied for.

Specifically, the control section 11 determines whether a value of the printed page counter that is stored in the user management table corresponding to the user's card number reaches the limit number of print pages corresponding to the printed page counter. If determining that the value of the printed page counter reaches the limit number of print pages, the control section 11 determines that the authentication information request condition is satisfied and proceeds to step S306 and if determining that the value of the printed page counter does not reach the limit number of print pages, the control section 11 determines that the authentication information request condition is not satisfied and returns to step S302.

At step S306, the control section 11 displays on the display 14*a* a message that requests a user to input a password (see FIG. 6) and waits until a password is input.

At step S307, the control section 11 authenticate a user with using the password input at step S306 (an example of the second authentication process).

Specifically, the control unit 11 reads the password corresponding to the user's card number from the user management table and determines whether the password input at step S306 is identical with the password read from the user management table.

If determining that the password is identical at step S307, the control section 11 determines that the authentication is successful at step S308 and proceeds to step S309 and if determining that the password is not identical at step S307, the control section 11 determines that the authentication is failed and proceeds to step S312.

At step S309, the control section 11 decreases the value of the printed page counter corresponding to the user's card number to be relatively smaller than the limit number of print pages. Namely, the number of remaining print pages that a user can execute printing operation is increased. Specifically, the control section 11 resets the value of the printed page counter to be zero. This increases the number of remaining print pages that a user can execute printing operations to be maximum. If the value of the printed page counter is reset to be zero, the value of the printed page counter does not reach the limit number of print pages. Therefore, it is determined at step S305 in a next process cycle that the value of the printed page counter of the user does not reach the limit number of print pages, and the printing operation is to be continued (an example of the second print control process).

At step S310, the control section displays on the display 14*a* a message indicating that the authentication is successful.

At step S311, the control section 11 rewrites the last authentication time corresponding to the user's card number as the current time and after the rewriting, the control section 11 returns to step S302 and continues printing of print data.

At step S312, the control section 11 displays on the display 14*a* a message indicating the authentication is failed.

At step S313, the control section 11 changes the state of the multifunctional apparatus 1 to the print prohibited state and terminates the process.

If the authentication is failed at step S308, the printing of the print data is interrupted to be stopped and the state of the multifunctional apparatus 1 is changed to the print prohibited state (an example of the second print control process).

(5-4) Increasing Process for Forcibly Increasing Number of Print Pages

Figure 9:
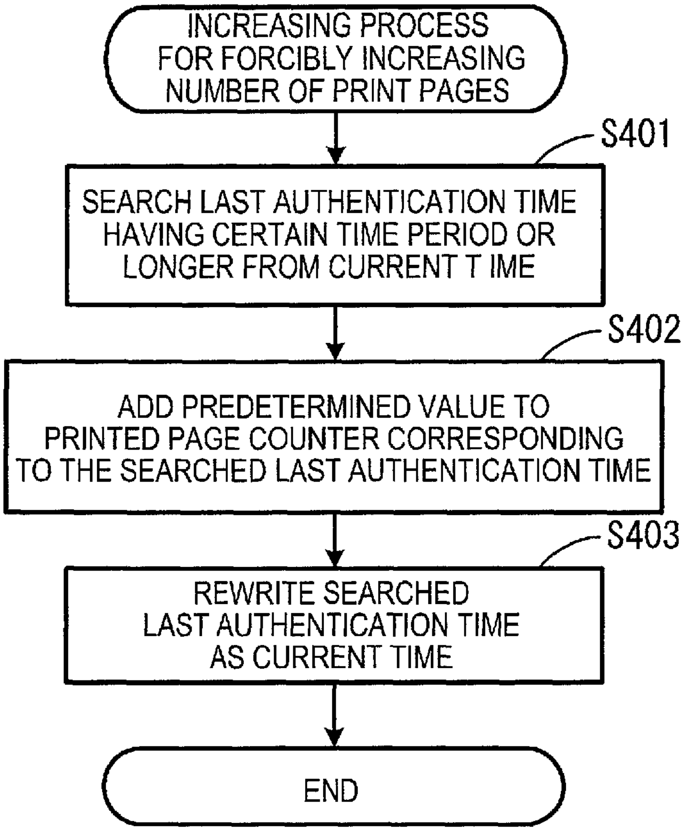
FIG. 9 is a flowchart illustrating a flow of an increasing process for forcibly increasing number of print pages.

A flow of the increasing process for forcibly increasing the number of print pages will be explained with reference to FIG. 9. This process is repeatedly executed for every predetermined time period (for example, every 24 hours) while the power of the multifunctional apparatus 1 is on.

At step S401, the control section 11 searches among the values of the last authentication time registered in the user management table the one that has a certain time period or longer from the current time.

At step S402, the control section 11 adds a predetermined value (for example, the pages corresponding to 10% of the limit number of print pages) to the printed page counter that is registered in the user management table corresponding to the last authentication time that is searched at step S401 (the last authentication time that has the predetermined time period or longer from the current time).

At step S403, the control section 11 rewrites the last authentication time that is searched at step S401 as the current time.

In the increasing process for forcibly increasing the number of print pages, a predetermined value is added to the printed page counter every predetermined time period passes. Therefore, even though any printing operation is not executed for the user, the number of pages that is allowed for the printing operation is decreased as time passes.

(5-5) Request Process for Forcibly Requesting a Password

Figure 10:
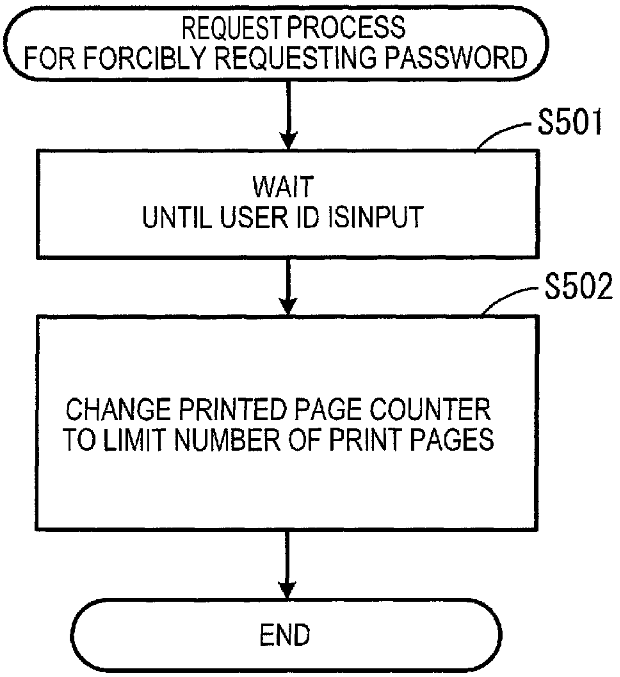
FIG. 10 is a flowchart illustrating a flow of a request process for forcibly requesting a password.

A flow of the request process for forcibly requesting a password will be explained with reference to FIG. 10. This process is started if a manger operates the operation section 14 to instruct execution of the request process for forcibly requesting a password.

At step S501, the control section 11 waits until the manger inputs an user ID.

At step S502, the control section 11 changes the value of the printed page counter that is registered in the user management table corresponding to the user ID that is input at step S501 to the value that is same as the limit number of print pages corresponding to the user ID.

In the request process for forcibly requesting a password, the value of the printed page counter is changed to the value of the limit number of print pages. Therefore, if the user whose user ID is already input by the manager passes the ID card 19 over the card reader 16, it is determined that a value of the printed page counter reaches the limit number of print pages at step S203 and input of a password is requested.

(6) Advantageous Effects of First Illustrative Aspect

According to the multifunctional apparatus 1 of the first illustrative aspect, if the value of printed page counter of the user who is authenticated by the first authentication process (step S201) reaches the limit number of print pages (S305: Yes), the control section 11 executes the second authentication process (step S307) to authenticate the user. If the user is not authenticated by the second authentication process, the printing operation is prohibited.

Therefore, even if the ID card 19 is stolen (the first authentication information is leaked), however, if the password (the second authentication information) is not leaked, a third person can only execute unauthorized printing operations for the remaining pages until the number of printed pages reaches the limit number of print pages.

Accordingly, unauthorized printing operation with a stolen ID card 19 is less likely to be executed.

Further, in the multifunctional apparatus 1 of the first illustrative aspect, if the authentication with using a password (the second authentication information) is successful, the control section 11 resets the user's printed page counter to be zero, and therefore, the user does not need to wait until the printed page counter is reset by the manager. Accordingly, the user can execute authentication with using the ID card 19 promptly and this improves ease of use of the multifunctional apparatus 1 for the user. The manager of the multifunctional apparatus 1 is not required to reset the user's printed page counter to be zero, and this improves convenience of the apparatus 1 for the manager.

The card number (the first authentication information) is stored in the ID card, and therefore, the card number may be stolen. In executing authentication of a user with using a medium that may be stolen, it is effective that another authentication of a user with using second authentication information that is different from the card number (a password) is used to execute authentication. This reduces damages caused by unauthorized printing.

In the multifunctional apparatus 1 of this illustrative aspect, a predetermined value is added to the value of the user's printed page counter every predetermined time period passes after the last authentication of a user. Therefore, the number of pages of recording medium that can be used is reduced as time passes, and this suppresses occurrence of unauthorized printing with a stolen ID card 19.

In the multifunctional apparatus 1 of this illustrative aspect, when a user whose card number is registered in the user management table passes the ID card 19 over the card reader 16 for the first time, the authentication of the user is executed with using a card number (the first authentication information) and also with using a password (the second authentication information).

Accordingly, if the ID card 19 is stolen before an original user of the ID card 19 is not authenticated by the first authentication process, and if a password (the second authentication information) is not leaked, a third person cannot execute unauthorized printing operation. Therefore, even if an ID card 19 is stolen, damages caused by unauthorized printing are suppressed.

Further, the manager can change the value of a user's printed page counter to the value same as the limit number of print pages in the request process for forcibly requesting a password. The value of the printed page counter of the user whose ID card may be suspected to be used for unauthorized printing is changed to be the value same as the limit number of print pages. This forcibly requests a user to input a password. Accordingly, even if an ID card 19 is stolen, damages caused by unauthorized printing are suppressed.

<Second Illustrative Aspect>

Figure 11:
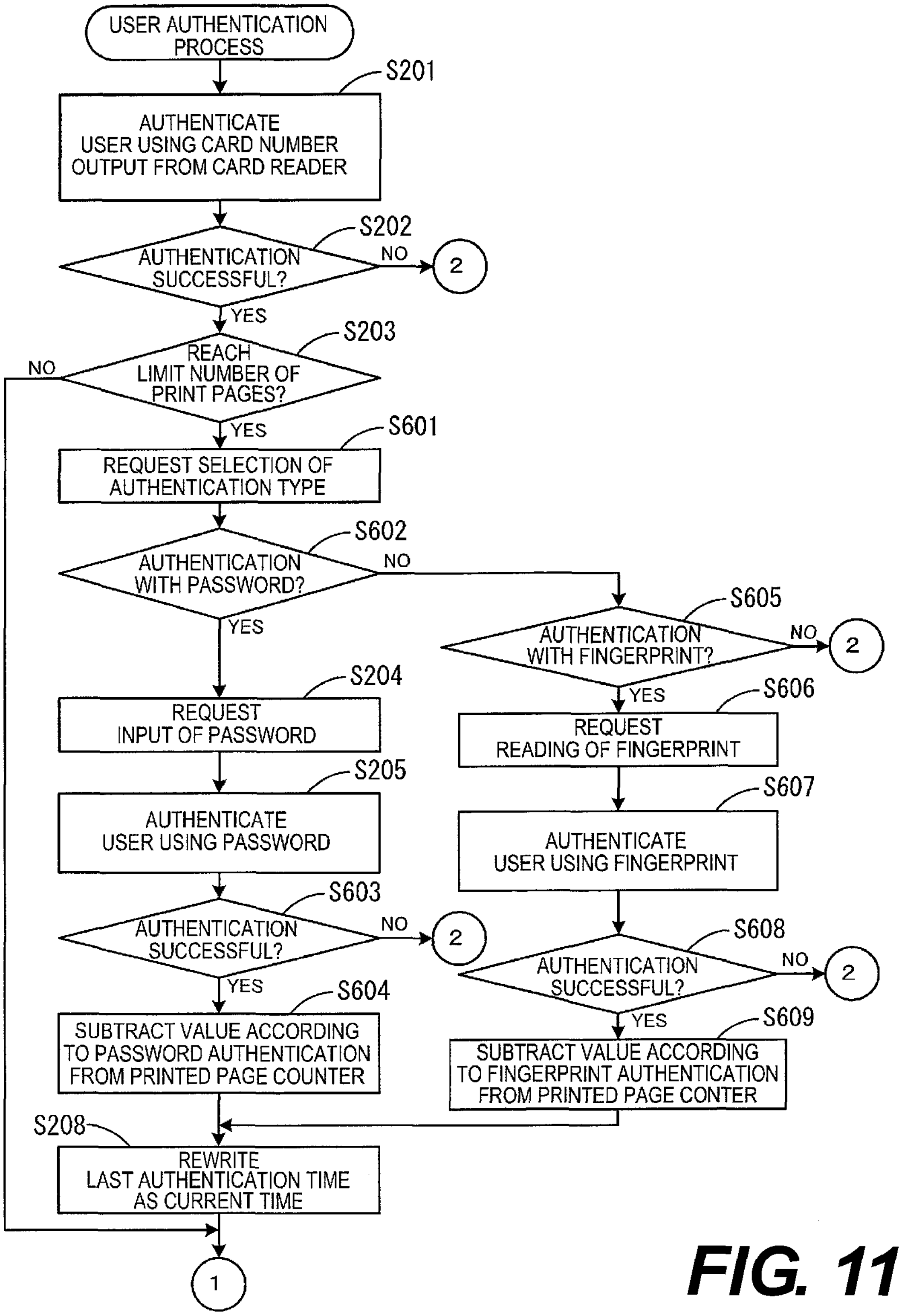
FIG. 11 is a flowchart illustrating a flow of a user authentication process according to a second illustrative aspect (a former half part)

A second illustrative aspect will be explained with reference to FIGS. 11 and 12.

In the second illustrative aspect, if the printed page counter reaches the limit number of print pages, a type of authentication can be selected by a user. A value that is to be subtracted from the printed page counter is determined according to a security level of the type of authentication that is selected by a user.

Types of authentication that can be selected include, for example, password authentication and fingerprint authentication. The multifunctional apparatus of the second illustrative aspect includes a device for executing fingerprint authentication separately from the card reader 16 and the storing section 15 previously stores fingerprints of users. Fingerprint is an example of one second authentication information and a password is an example of an example of another second authentication information that has a security level lower than the one second authentication information.

A flow of the user authentication process of the second illustrative aspect will be explained with reference to FIGS. 11 and 12. Same numbers and symbols are used for the processes substantially similar to the first illustrative aspect and the similar processes will not be explained.

At step S601, the control section 11 requests selection of a type of authentication and if a user selects a type of authentication, the process proceeds to step S602.

At step S602, the control section 11 determines whether the password authentication is selected, and if the control section 11 determines that the password authentication is selected, the process proceeds to step S204 and if the control section 11 determines that the password authentication is not selected, the process proceeds to step S605.

Figure 12:
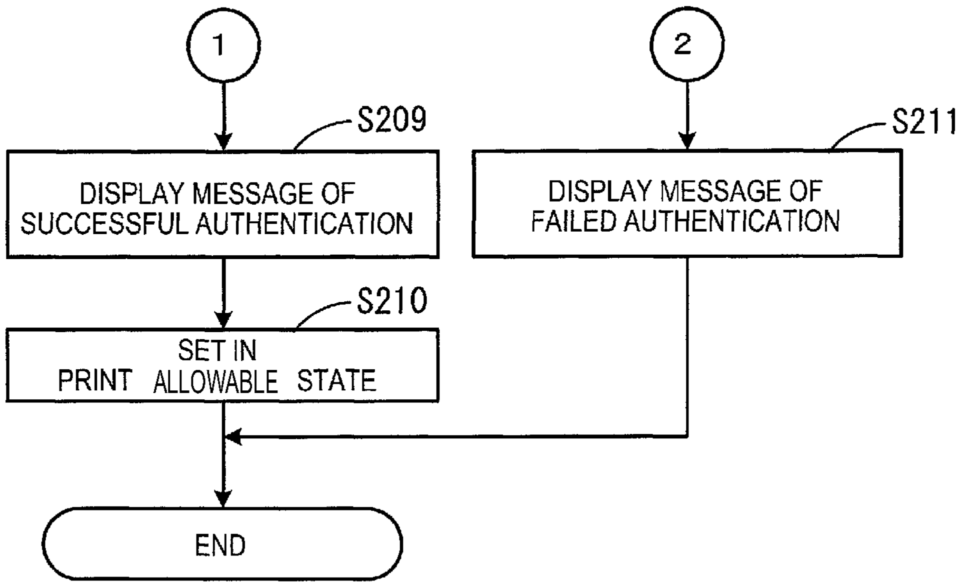
FIG. 12 is a flowchart illustrating a flow of a user authentication process according to a second illustrative aspect (a latter half part)

If the control section 11 determines that the authentication is successful at step S603, the process proceeds to step S604 and if the control section 11 determines that the authentication is failed at step S603, the process proceeds to step S211 (in FIG. 12).

At step S604, the control section 11 subtracts the value according to the password authentication from the printed page counter corresponding to the card number (an example of a count value changing process).

For example, the password authentication has higher possibility that a fake user executes the password authentication compared to the fingerprint authentication. Namely, the password authentication has a lower security level compared to the fingerprint authentication. Therefore, the value that is subtracted from the printed page counter is "10".

At step S605, the control section 11 determines whether fingerprint authentication is selected. If the control section 11 determines that the fingerprint authentication is selected at step S605, the process proceeds to step S606 and if the control section 11 determines that the fingerprint authentication is not selected, the process proceeds to step S211.

At step S606, the control section 11 displays on the display 14*a* a message that requests reading of fingerprint and waits until a fingerprint is read.

At step S607, the control section 11 compares the fingerprint that is read at step S606 with the fingerprint that is registered in the storing section 15 to authenticate the user.

If the control section 11 determines that the authentication is successful at step S608, the process proceeds to step S609 and if the control section 11 determines that the authentication is failed, the process proceeds to step S211.

At step S609, the control section 11 subtracts the value according to the fingerprint authentication from the printed page counter corresponding to the card number (an example of the count value changing process).

For example, the fingerprint authentication has lower possibility that a fake user executes the fingerprint authentication compared to the password authentication. Namely, the fingerprint authentication has a higher security level compared to the password authentication. Therefore, the value that is subtracted from the printed page counter is "100".

In the multifunctional apparatus 1 of the second illustrative aspect, as the security level of the second authentication information becomes lower, the difference between the value of the printed page counter and the limit number of print pages is set to be smaller. As the security level of the second authentication information becomes lower, the possibility of leaking the second authentication information becomes higher. However, as the security level of the second authentication information becomes lower, the difference between the value of the printed page counter and the limit number of print pages becomes smaller. Therefore, the number of pages that can be used for unauthorized printing by a third person is decreased. Accordingly, unauthorized printing due to leaking of the second authentication information that has a lower security level is less likely to occur.

The user authentication process is explained, and the second illustrative aspect may be applied to a printing process.

<Third Illustrative Aspect>

Next, a third illustrative aspect will be explained.

In the first illustrative aspect, a password is registered in the user management table. In the third illustrative aspect, a password is stored in the ID card 19.

No password is stored in the user management table of the third illustrative aspect.

In the third illustrative aspect, the card reader 16 reads from the ID card 19 a card number and a password. If a user inputs a password at step S204, the control section 11 compares the password that is read by the card reader 16 with the password that is input by a user at step S204 to authenticate the user.

In the third illustrative aspect, the card number and the password are stored in the ID card 19, however, a third person who illegally obtains the ID card 19 cannot know the password stored in the ID card 19. Therefore, even if the third person is requested to input a password from the multifunctional apparatus 1, the third person cannot input a correct password. This suppresses damages caused by unauthorized printing due to a stolen ID card 19.

Other configurations and processes of the multifunctional apparatus 1 of the third illustrative aspect are substantially similar to the first illustrative aspect or the second illustrative aspect.

<Fourth Illustrative Aspect>

Figure 14:
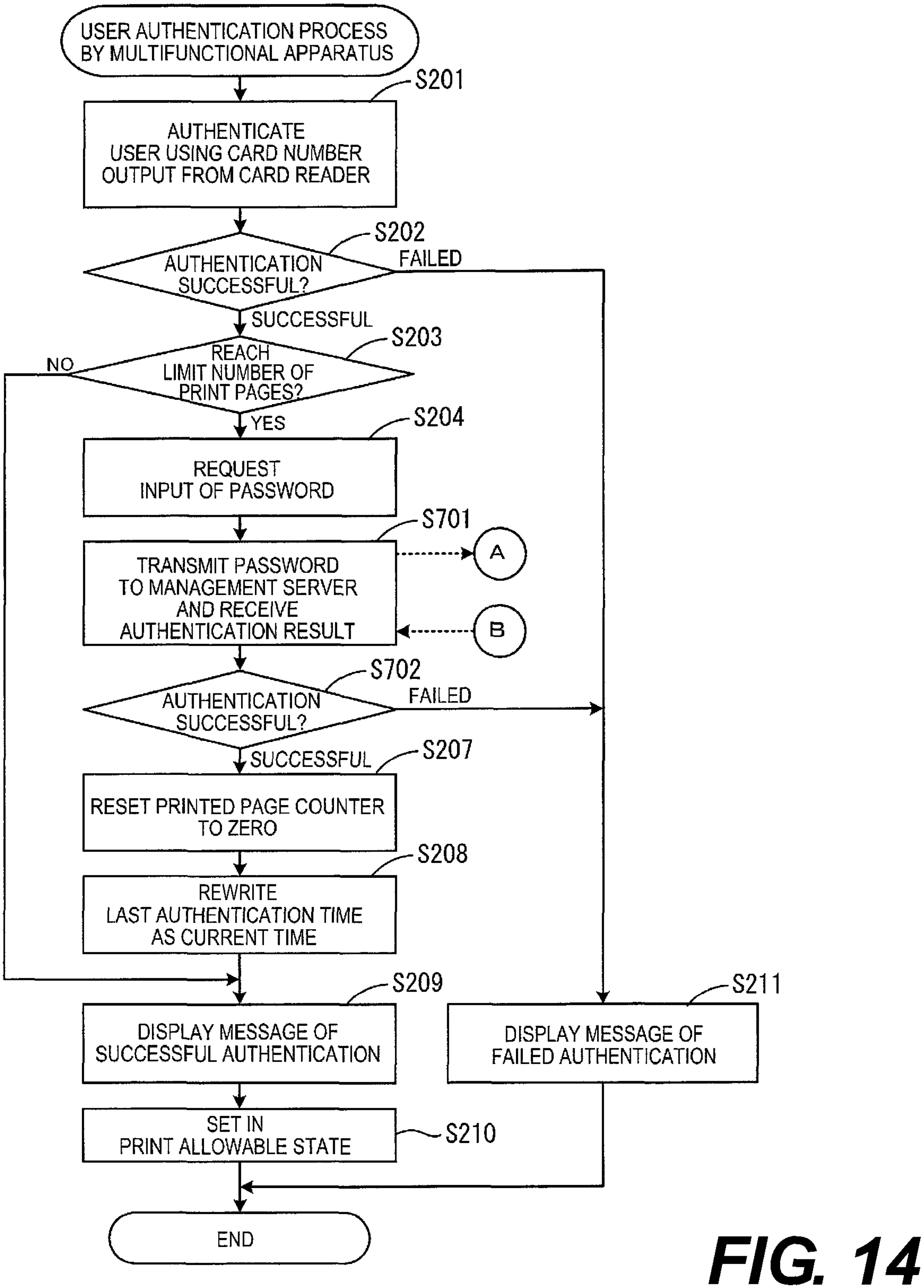
FIG. 14 is a flowchart illustrating a flow of a user authentication process by a multifunctional apparatus.
Figure 15:
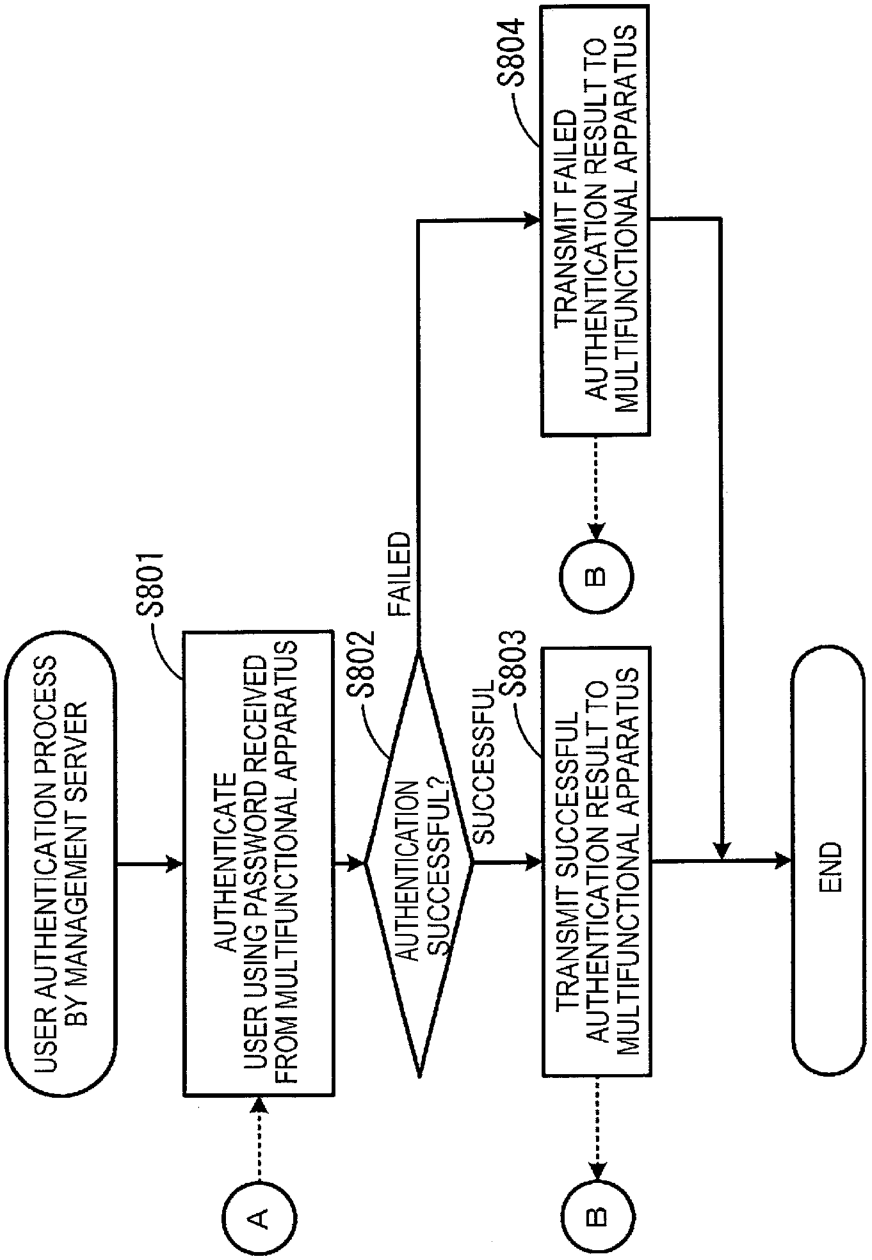
FIG. 15 is a flow chart illustrating a flow of a user authentication process by a management server.

Next, a fourth illustrative aspect will be explained with reference to FIGS. 13 to 15.

In the first illustrative aspect, the multifunctional apparatus 1 executes the authentication using a card number (the first authentication information) and the authentication using a password (the second authentication information). In the fourth illustrative aspect, the multifunctional apparatus 1 executes the authentication using a card number (the first authentication information) and an external management sever 31 executes the authentication using a password (the second authentication information) (see FIG. 13).

A construction of a print management system 30 of the fourth illustrative aspect will be explained with reference to FIG. 13. The print management system 30 is configured by the multifunctional apparatus 1 and the management server 31 which are connected to have mutual communication via a communication network 5 such as a LAN or an internet.

The management server 31 is a computer that receives a user ID and a password (the second authentication information) from the multifunctional apparatus 1 to authenticate a user and transmits an authentication result to the multifunctional apparatus 1. For example, a server that manages collectively users who login the network is provided in many systems. Specifically for example, a server in which Windows (registered trademark), that is an operation system (OS) of Microsoft, is installed collectively manages users, or a server in which UNIX (registered trademark), that is an OS of a computer, is installed and which executes NIS (Network Information Service) collectively manages users. Known servers can be used for the management server 31.

Figure 13:
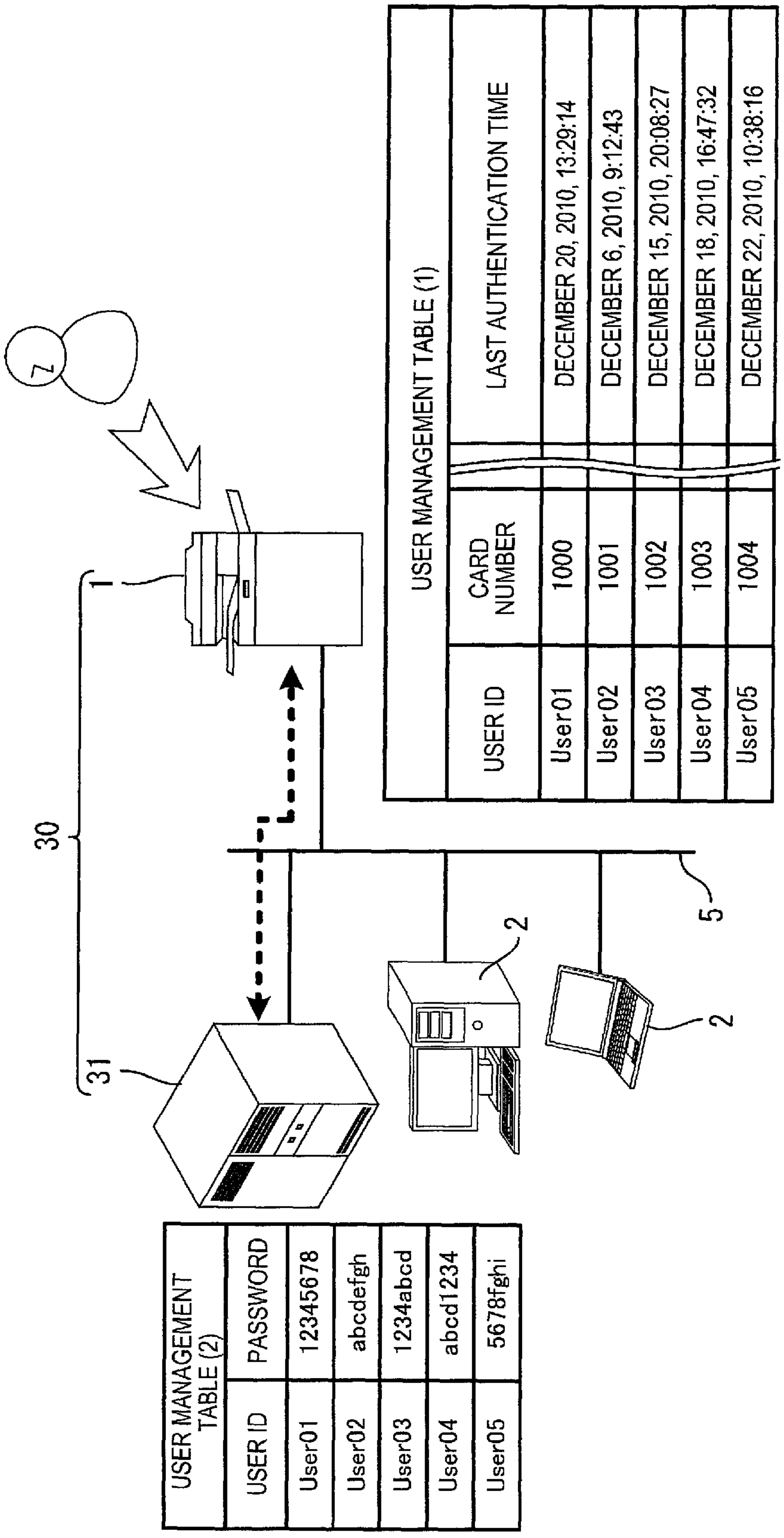
FIG. 13 is a typical view illustrating a construction of a print management system according to a fourth illustrative aspect.

As is illustrated in FIG. 13, the user management table is stored in the multifunctional apparatus 1 and in the management server 31. Specifically, the multifunctional apparatus 1 stores a user management table (1) in which items excluding the passwords from the user management table of the first illustrative aspect are registered, and the management server 31 stores a user management table (2) in which the user IDs and the passwords are registered.

A flow of a user authentication process executed by the multifunctional apparatus 1 of the fourth illustrative aspect will be explained with reference to FIG. 14. Same numerals and symbols are provided to the processes that are substantially similar to those of the first illustrative aspect.

At step S701, the control section 11 reads from the user management table (1) a user ID corresponding to the card number that is output from the card reader 16 and transmits the read user ID and the password (the second authentication information) that is input at step S204 to the management sever 31 and requests authentication.

If receiving the user ID and the password from the multifunctional apparatus 1, the management server 31 authenticates the user with using the received user ID and password and returns the authentication result to the multifunctional apparatus 1. Details of the user authentication process executed by the management server 31 will be described later.

At step S702, the control section 11 determines whether the authentication result received from the management server 31 is successful, and if the control section 11 determines that the authentication result is successful, the process proceeds to step S207 and if the control section 11 determines that the authentication result is failed, the process proceeds to step S211 (an example of the second print control process).

A flow of the user authentication process executed by the management server 31 will be explained with reference to FIG. 15.

At step S801, the management server 31 authenticates a user with using the user ID and the password (the second authentication information) received from the multifunctional apparatus 1. Specifically, the management server 31 determines whether a combination of the user ID and the password received from the multifunctional apparatus 1 is registered in the user management table (2). If determining that it is registered in the user management table (2), the management server 31 determines that the authentication is successful and if determining that it is not registered in the user management table (2), the management server 31 determines that the authentication is failed.

If the management server 31 determines that the authentication is successful at step S802, the process proceeds to step S803 and if the management server 31 determines that the authentication is failed, the process proceeds to step S804.

At step S803, the management server 31 transmits an authentication result representing that the authentication is successful to the multifunctional apparatus 1.

At step S804, the management server 31 transmits an authentication result representing that the authentication is failed to the multifunctional apparatus 1 and this process is terminated.

The second authentication process in the printing process of the fourth illustrative aspect is similar to the above-described user authentication process and the authentication with using a password (the second authentication information) is executed by the external management server 31. Specifically, in the printing process of the fourth illustrative aspect, the process of step S701 in FIG. 14 is executed instead of the process of step S307 in the flowchart in FIG. 8, and it is determined whether the authentication is successful at step S308 based on the authentication result received from the management server 31. Other processes of the printing process of the fourth illustrative aspect are substantially similar to the printing process of the first illustrative aspect and therefore will not be explained.

In the multifunctional apparatus 1 of the fourth illustrative aspect, the external management server 31 executes the authentication with using a password (the second authentication information). Therefore, even if a plurality of multifunctional apparatuses 1 is provided, the management server 31 does not necessarily manage a password for each of the multifunctional apparatuses 1. This reduces burden of the manager of the multifunctional apparatus 1. The multifunctional apparatus 1 does not necessarily have a function of user authentication using a password (the second authentication information). This simplifies a construction of the multifunctional apparatus 1.

<Fifth Illustrative Aspect>

A fifth illustrative aspect will be explained with reference to FIGS. 16 to 20.

In the fourth illustrative aspect, the authentication with using a card number (the first authentication information) is executed by the multifunctional apparatus 1 and the authentication with using a password (the second authentication information) is executed by the external management server 31. In the fifth illustrative aspect, the authentication with using a card number (the first authentication information) and the authentication with using a password (the second authentication information) are executed by an external management server.

Figure 16:
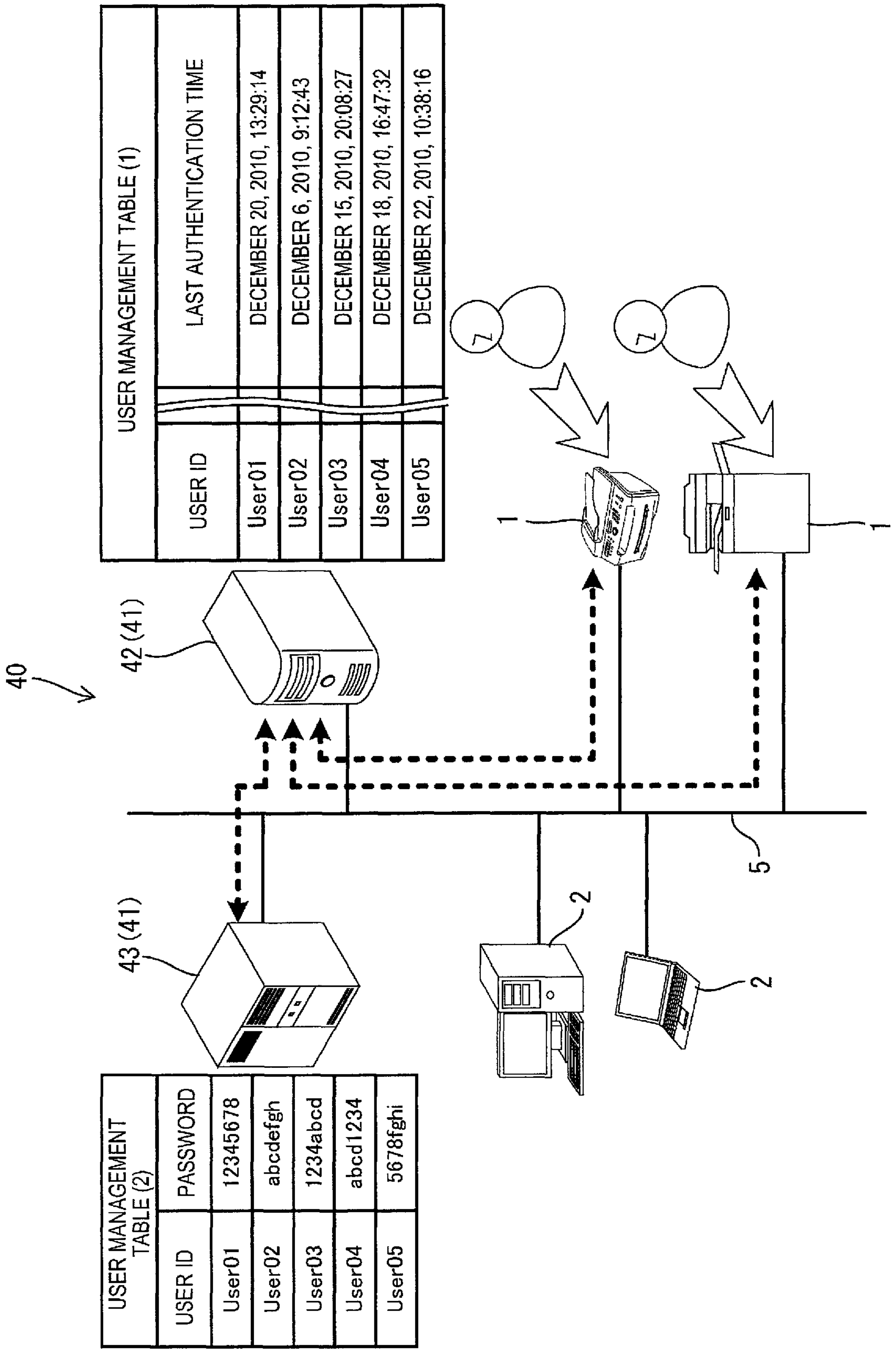
FIG. 16 is a typical view illustrating a construction of a print management system according to a fifth illustrative aspect.

A construction of a print management system 40 of the fifth illustrative aspect will be explained with reference to FIG. 16. The management server 41 of the fifth illustrative aspect is configured by a multifunctional apparatus management server 42 (an example of the first management server) that executes authentication with using a card number (the first authentication information) and a user authentication server 43 (an example of the second management server) that executes authentication with using a password (the second authentication information). The control section 11 of the multifunctional apparatus 1 is an example of the first controller and the CPU of the multifunctional apparatus management server 42 is an example of the second control unit and the CPU of the user authentication server 43 is an example of the third control unit.

The multifunctional apparatus management server 42 and the user authentication server 43 may be configured by one computer.

In the fifth illustrative aspect, the user management table is stored separately in the multifunctional apparatus management server 42 and in the user authentication server 43 and is not stored in the multifunctional apparatus 1. Specifically, the multifunctional apparatus management server 42 stores the user management table (1) that is stored in the multifunctional apparatus 1 in the fourth illustrative aspect. The user authentication server 43 stores the user management table (2) that is stored in the management server 31 in the fourth illustrative aspect.

Figure 17:
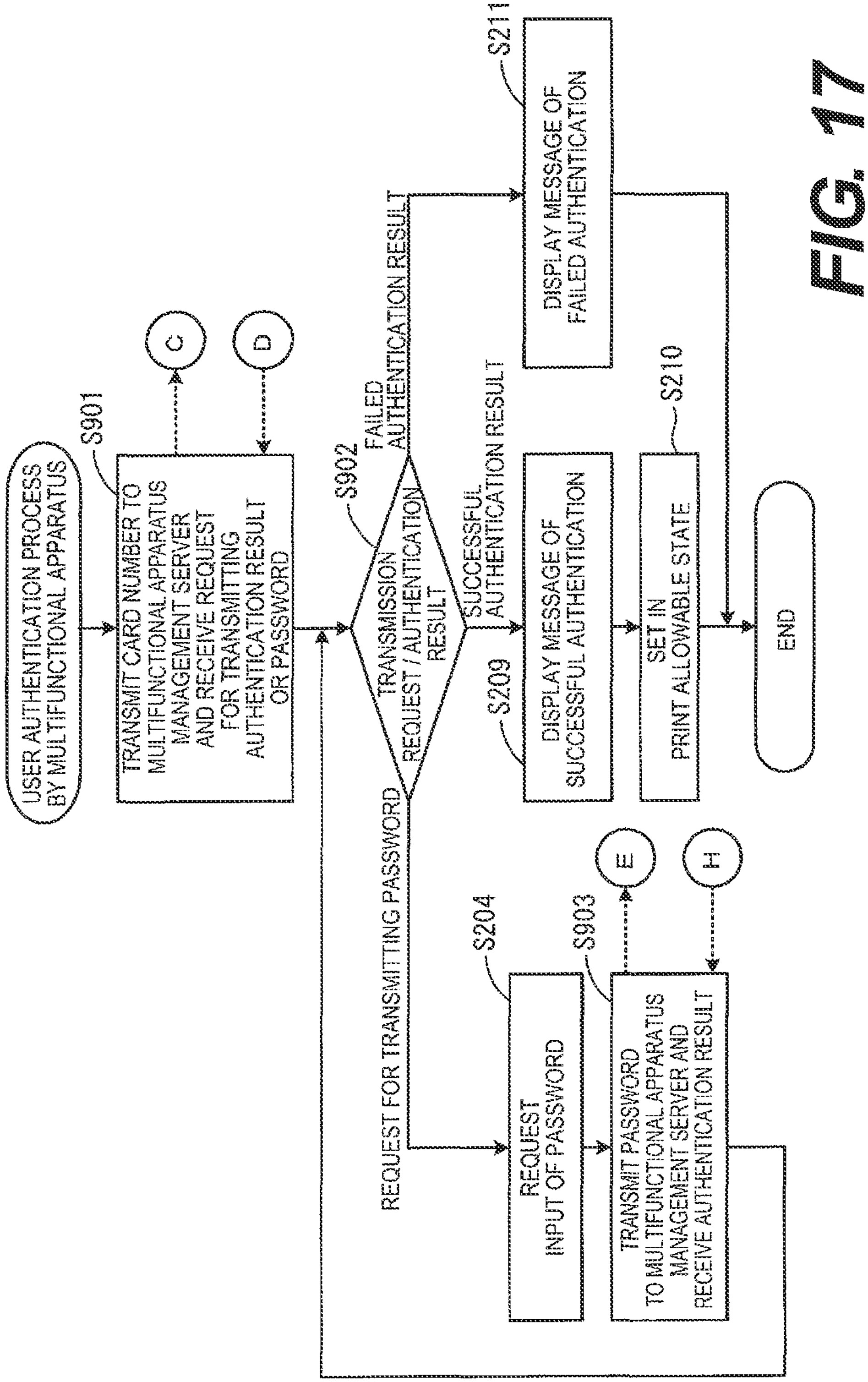
FIG. 17 is a flowchart illustrating a flow of a user authentication by a multifunctional apparatus.

A flow of the user authentication process executed by the multifunctional apparatus 1 of the fifth illustrative aspect will be explained with reference to FIG. 17. The multifunctional apparatus 1 executes the user authentication program to execute this process. The same symbols and numbers are provided to the processes substantially similar to those in the first illustrative aspect and the processes will not be explained.

At step S901, the control section 11 transmits the card number (the first authentication information) output from the card reader 16 to the multifunctional apparatus management server 42 to request the authentication (an example of the first authentication process).

If receiving a card number from the multifunctional apparatus 1, the multifunctional management server 42 executes the user authentication process (1). The user authentication process (1) is generally explained and will be explained in detail later. If receiving a card number from the multifunctional apparatus 1, the multifunctional apparatus management server 42 authenticates a user with using the card number. If determining that the authentication is failed, the multifunctional apparatus management server 42 returns the authentication result representing that the authentication is failed to the multifunctional apparatus 1. On the other hand, if determining that the authentication is successful, the multifunctional apparatus management server 42 determines whether the printed page counter corresponding to the card number reaches the limit number of print pages. If determining that the printed page counter does not reach the limit number of print pages, the multifunctional apparatus management server 42 returns the authentication result representing that the authentication is successful to the multifunctional apparatus 1 and if determining that the printed page counter reaches the limit number of print pages, the multifunctional apparatus management server 42 returns the multifunctional apparatus 1 a request for transmitting a password (the second authentication information) to execute the second authentication process.

At step S902, the control section 11 determines whether to receive from the multifunctional apparatus management server 42 the request for transmitting a password (the second authentication information) or determines whether to receive the authentication result. If the control section 11 receives the request for transmitting a password, the process proceeds to step S204. On the other hand, if receiving the authentication result, the control section 11 determines whether the authentication result is a successful result. If determining that the authentication result is a successful result, the process proceeds to step S209 and if determining that the authentication result is a failure result, the process proceeds to step S211.

At step S903, the control section 11 transmits the card number output from the card reader 16 and the password (the second authentication information) input at the step S204 to the multifunctional apparatus management server 42 and requests the authentication.

If receiving the card number and the password from the multifunctional apparatus 1, the multifunctional apparatus management server 42 executes the user authentication process (2). The user authentication process (2) is generally explained and will be explained in detail later. If receiving a card number and a password (the second authentication information) from the multifunctional apparatus 1, the multifunctional apparatus management server 42 reads the user ID corresponding to the card number from the user management table (1). The multifunctional apparatus management server 42 transmits the read user ID and the received password to the user authentication server 43 and requests the authentication. The multifunctional apparatus management server 42 receives an authentication result from the user authentication server 43 and returns the authentication result to the multifunctional apparatus 1.

Figure 18:
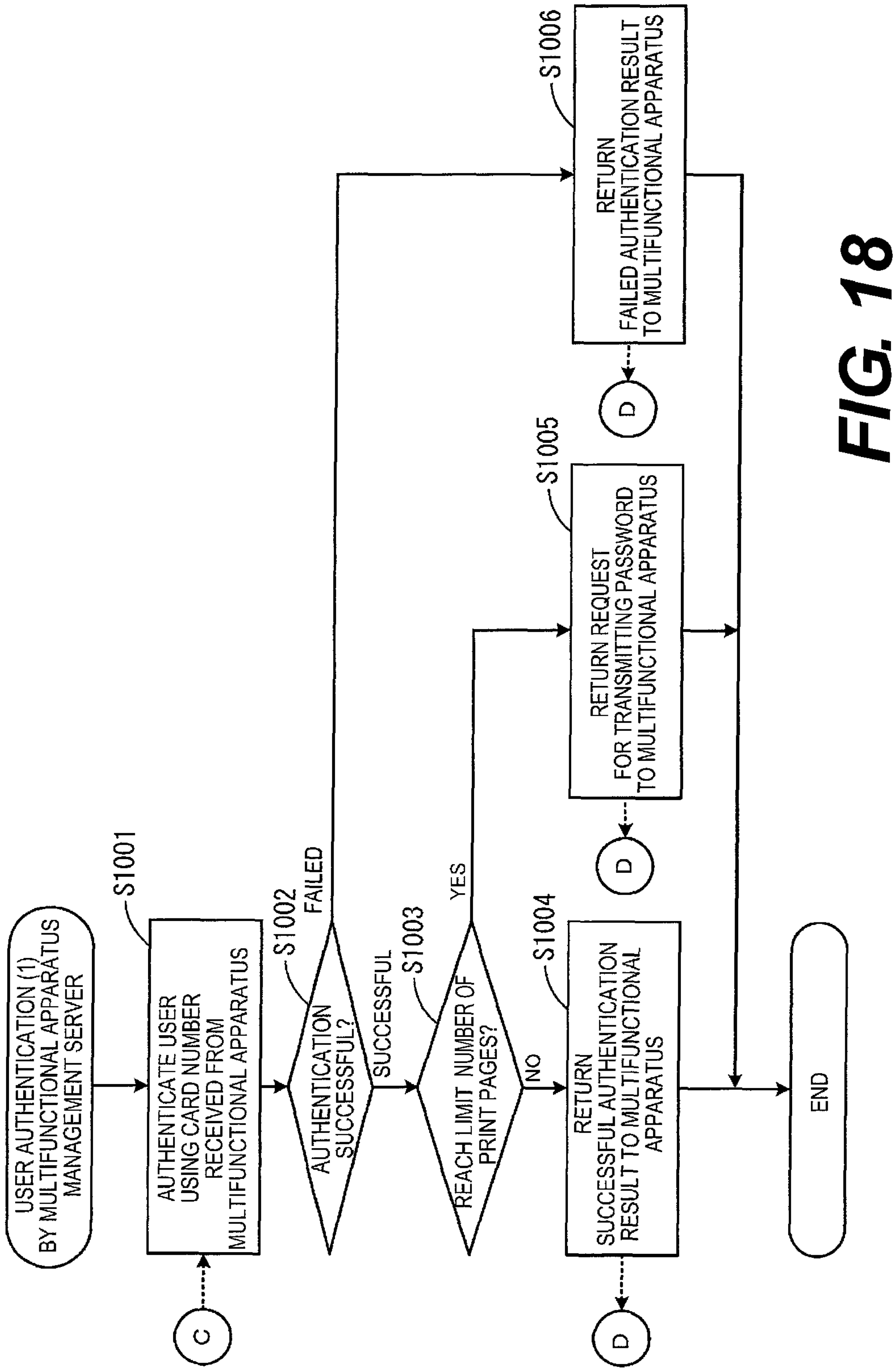
FIG. 18 is a flowchart illustrating a flow of a user authentication process (1) by a multifunctional apparatus management server.

A flow of the user authentication process (1) executed by the multifunctional apparatus management server 42 will be explained with reference to FIG. 18.

At step S1001, the multifunctional apparatus management server 42 authenticates a user with using the card number received from the multifunctional apparatus 1. Specifically, the multifunctional apparatus management server 42 determines whether the received user ID is registered in the user management table (1) or not. If determining that the received user ID is registered in the user management table (1), the multifunctional apparatus management server 42 determines that the authentication is successful. If determining that the received user ID is not registered in the user management table (1), the multifunctional apparatus management server 42 determines that the authentication is failed.

If the multifunctional apparatus management server 42 determines that the authentication is successful at step S1002, the process proceeds to step S1003 and if the multifunctional apparatus management server 42 determines that the authentication is failed at step S1002, the process proceeds to step S1006.

At step S1003, the multifunctional apparatus management server 42 reads from the user management table (1) the limit number of print pages and the printed page counter corresponding to the card number and determines whether the printed page counter reaches the limit number of print pages. If the multifunctional apparatus management server 42 determines that the printed page counter does not reach the limit number of print pages, the process proceeds to step S1004, and if the multifunctional apparatus management server 42 determines that the printed page counter reaches the limit number of print pages, the process proceeds to step S1005.

At step S1004, the multifunctional apparatus management server 42 returns the successful authentication result to the multifunctional apparatus 1.

At step S1005, the multifunctional apparatus management server 42 returns the request for transmitting a password (the second authentication information) to the multifunctional apparatus 1 to execute the second authentication process.

At step S1006, the multifunctional apparatus management server 42 returns the authentication result representing that the authentication is failed to the multifunctional apparatus 1.

Figure 19:
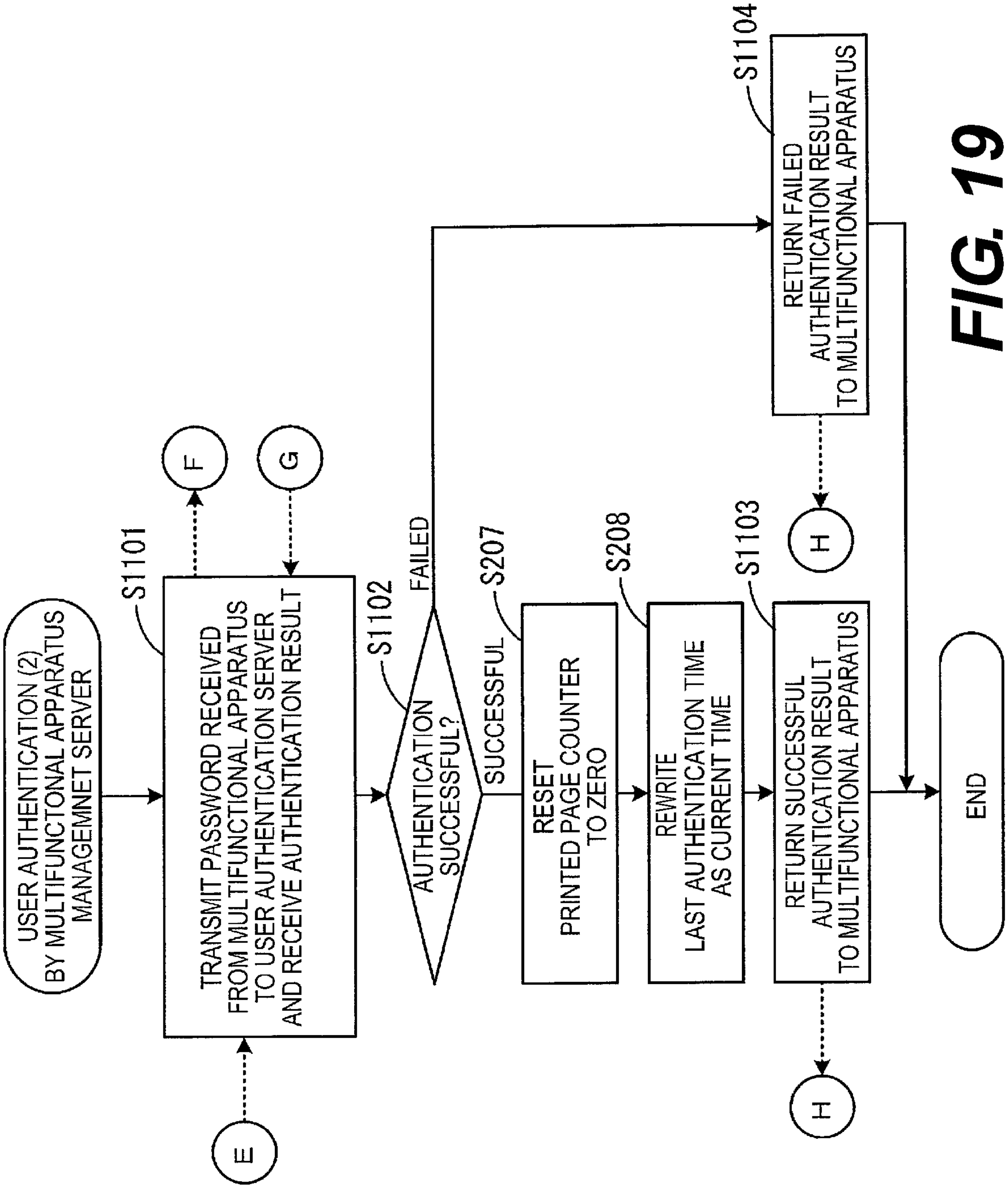
FIG. 19 is a flowchart illustrating a flow of a user authentication process (1) by a multifunctional apparatus management server.

A flow of the user authentication process (2) executed by the multifunctional apparatus management server 42 will be explained with reference to FIG. 19.

At step S1101, the multifunctional apparatus management server 42 reads from the user management table (1) the user ID corresponding to the card number that is received from the multifunctional apparatus 1, and transmits to the user authentication server 43 the read user ID (an example of user identifier information) and the password (the second authentication information) received from the multifunctional apparatus 1 and requests the authentication.

If receiving the user ID and the password from the multifunctional apparatus management server 42, the user authentication server 43 authenticates a user with using the received user ID and the password and returns the authentication result to the multifunctional apparatus management server 42. Details of the user authentication process executed by the user authentication server 43 will be described later.

If the multifunctional apparatus management server 42 determines that the authentication is successful at step S1102, the process proceeds to step S207 and if the multifunctional apparatus management server 42 determines that the authentication is failed, the process proceeds to step S1104.

At step S1103, the multifunctional apparatus management server 42 returns the authentication result representing that the authentication is successful to the multifunctional apparatus 1.

At step S1104, the multifunctional apparatus management server 42 returns the authentication result representing that the authentication is failed to the multifunctional apparatus 1.

Figure 20:
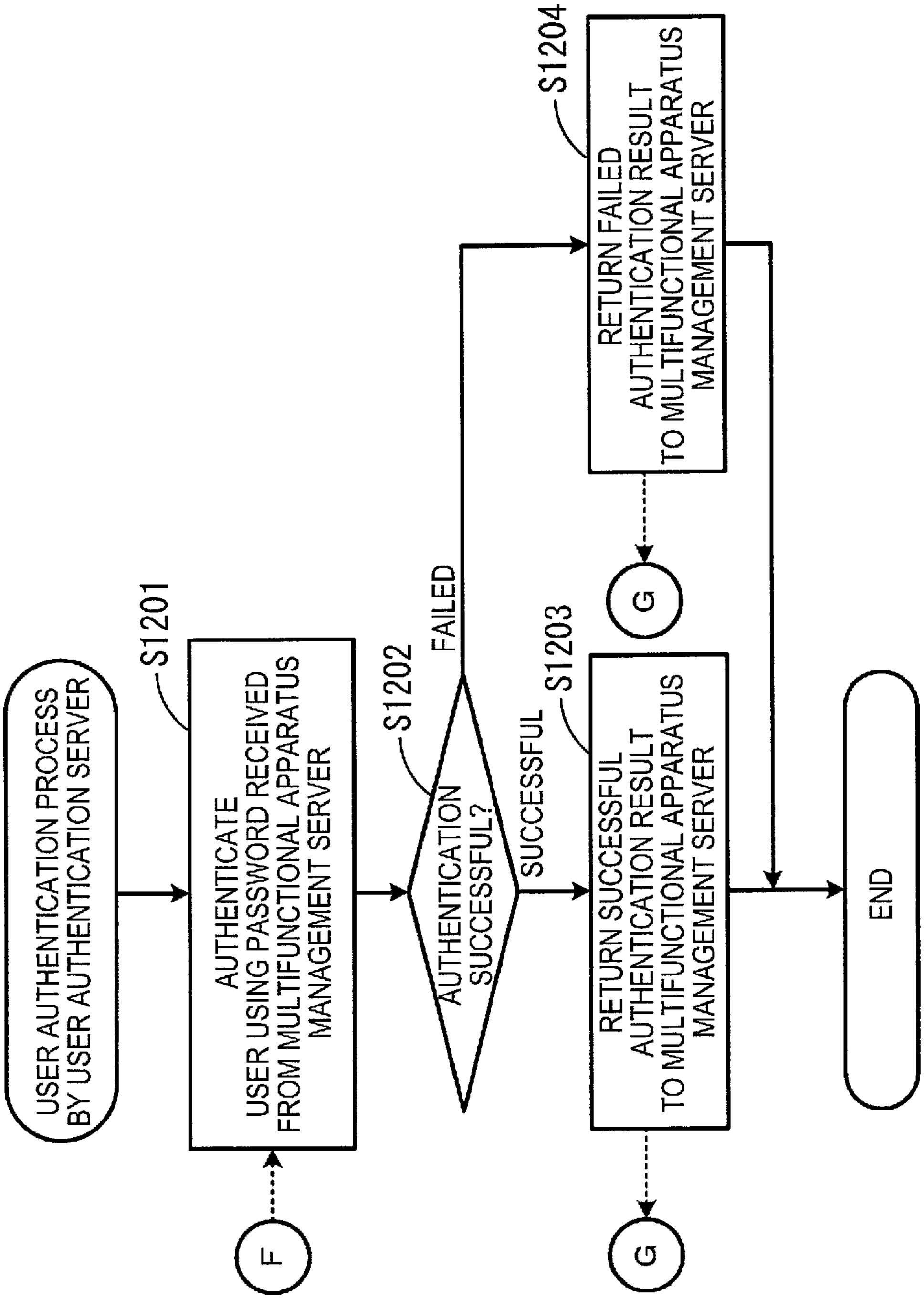
FIG. 20 is a flowchart illustrating a flow of a user authentication process by a user authentication server.

A flow of the user authentication process executed by the user authentication server 43 will be explained with reference to FIG. 20. The user authentication process executed by the user authentication server 43 is substantially similar to the user authentication process executed by the management server 31 according to the fourth illustrative aspect (FIG. 15) and therefore, only the flowchart is illustrated and the processes thereof will not be explained.

The user authentication process of the fifth illustrative aspect has been explained. The second authentication process of the printing process according to the fifth illustrative aspect is similar to the above-described user authentication process and the authentication with using a password (the second authentication information) is executed by the user authentication server 43. Specifically, in the printing process of the fifth illustrative aspect, the process of step S903 in FIG. 17 is executed instead of the process of step S307 in the flowchart in FIG. 8, and it is determined whether the authentication is successful based on the authentication result received from the multifunctional apparatus management server 42 at step S308.

Figure 8:
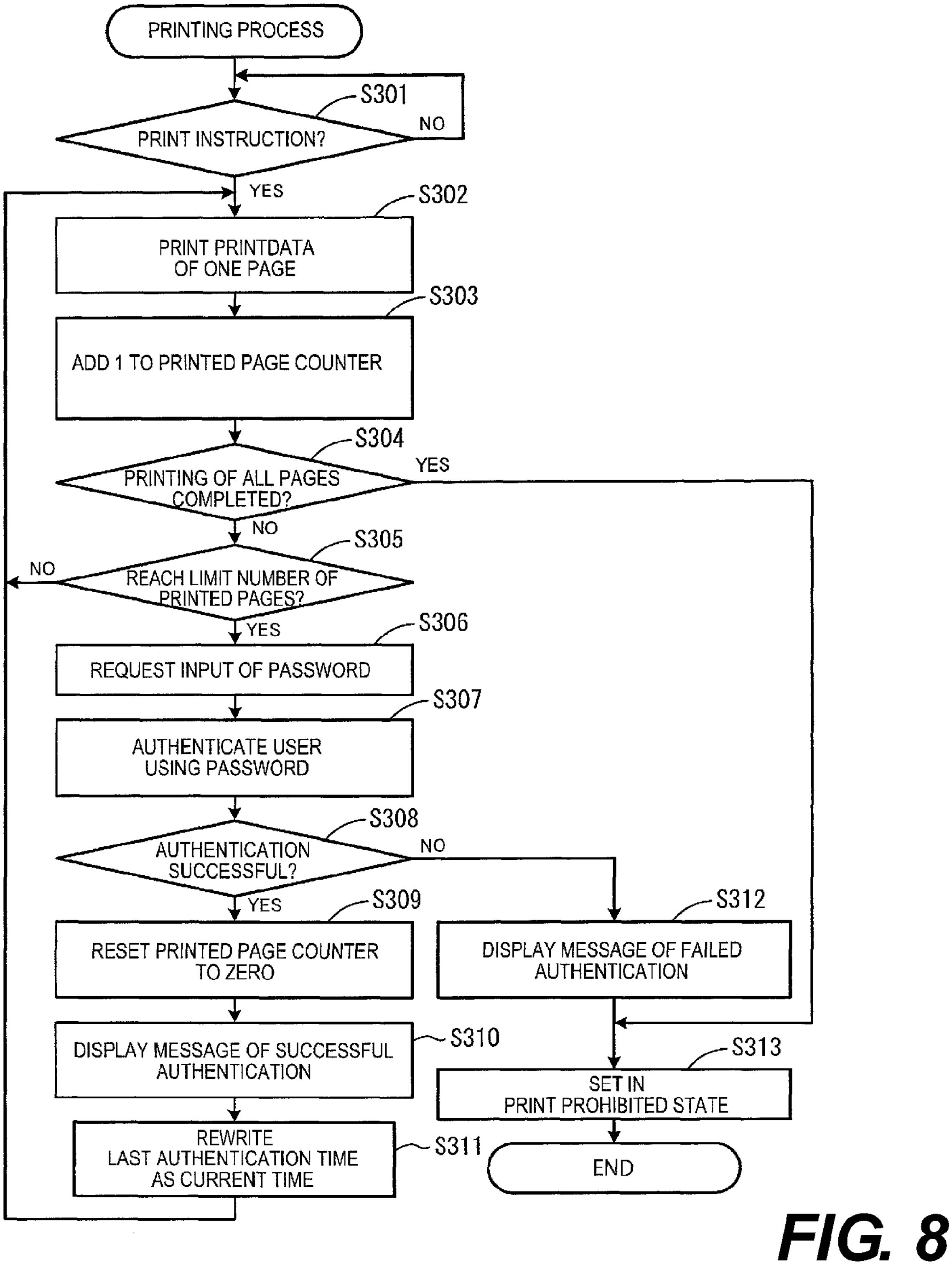
FIG. 8 is a flowchart illustrating a flow of a printing process.

In the printing process of the fifth illustrative aspect, "1" is added to the printed page counter of the user management table (1) stored in the multifunctional apparatus management server 42 at step S303 of the flowchart in FIG. 8 according to the first illustrative aspect. The printed page counter that is stored in the user management table (1) is reset to zero at step S309, and the last authentication time that is stored in the user management table (1) is updated to the current time at step S311.

Other processes of the printing process according to the fifth illustrative aspect are substantially similar to those of the printing process according to the first illustrative aspect, and the processes will not be explained.

In the multifunctional apparatus 1 of the fifth illustrative aspect, the external management server 41 executes the authentication with using a card number (the first authentication information) and the authentication with suing a password (the second authentication information), and this simplifies the construction of the multifunctional apparatus 1.

The user management table (2) is managed by the user authentication server 43. Accordingly, a user can login other terminals than the multifunctional apparatus 1 with using the same password that is used to login the multifunctional apparatus 1. Compared to a case in which the passwords are managed separately by the user authentication server 43 and each multifunctional apparatus 1, burdens of a user who manages the multifunctional apparatuses 1 can be decreased. However, the user authentication server 43 stores only the user management table (2) and does not store the user management table (1). In such a case, if the multifunctional apparatus 1 stores the user management table (1) and a plurality of multifunctional apparatuses 1 are provided, the management of the user management table (1) is troublesome.

In the print management system 40 of the fifth illustrative aspect, the multifunctional management server 42 stores the user management table (1), and therefore, if a plurality of multifunctional apparatuses 1 is provided, one multifunctional apparatus management server 42 manages one user management table (1) to manage all the multifunctional apparatuses 1. This reduces burdens of the user who manages the multifunctional apparatuses 1.

<Sixth Illustrative Aspect>

Figure 21:
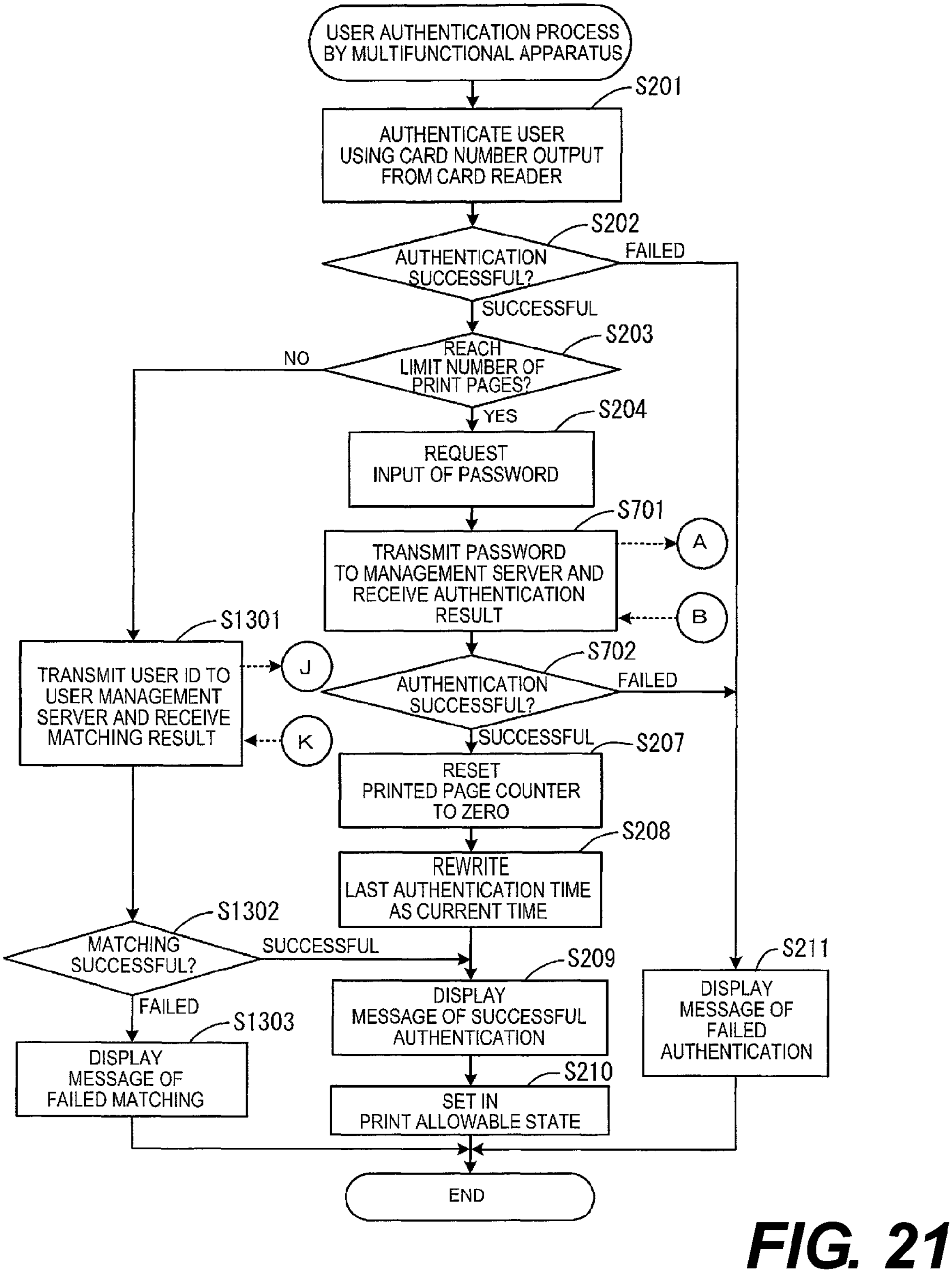
FIG. 21 is a flowchart illustrating a flow of a user authentication process by a multifunctional apparatus according to a sixth illustrative aspect.
Figure 22:
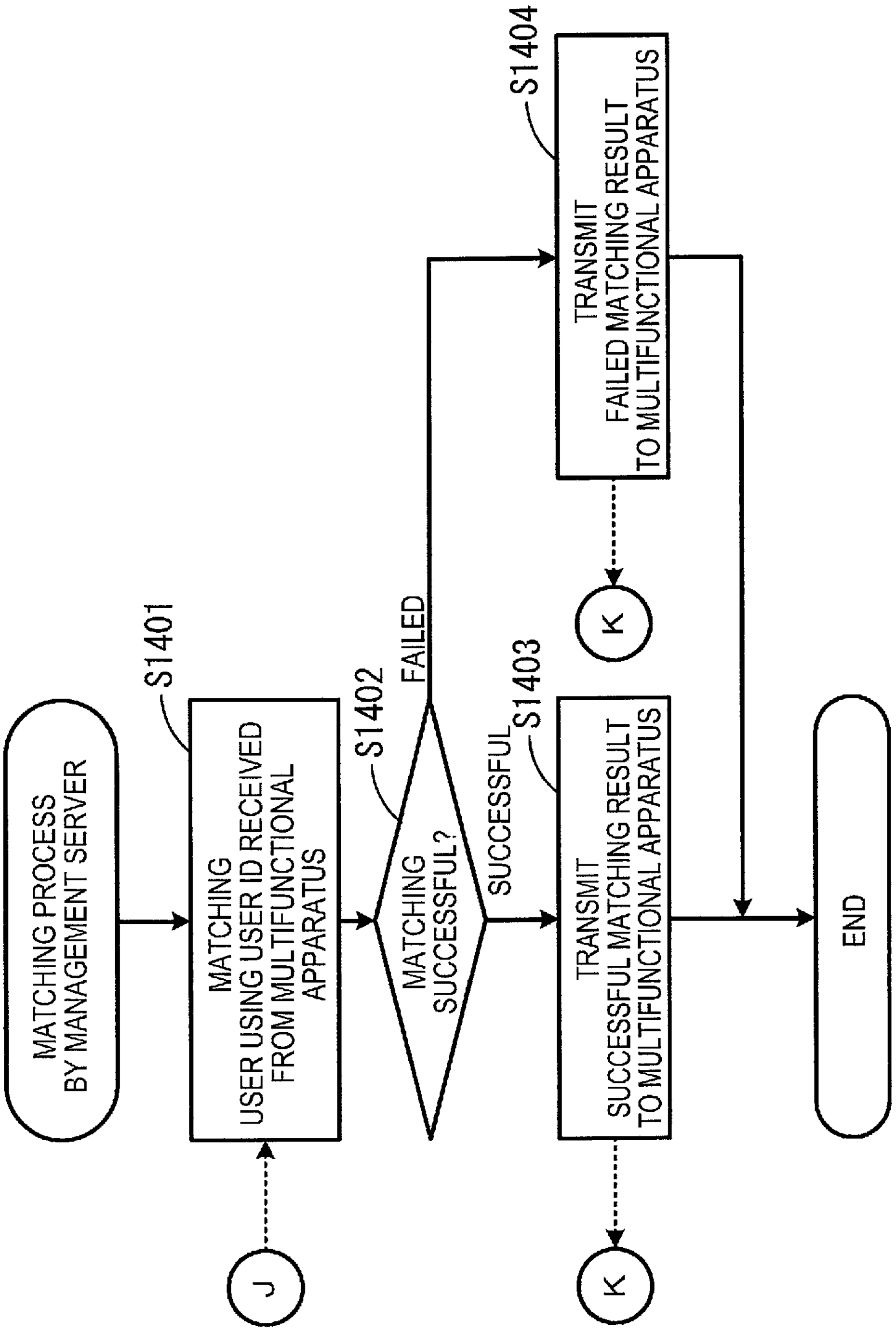
FIG. 22 is a flowchart illustrating a flow of a matching process by a management server.

Next, a sixth illustrative aspect will be explained with reference to FIGS. 21 and 22.

A configuration of a print management system of the sixth illustrative aspect is similar to that of the fourth illustrative aspect. In the fourth illustrative aspect, after the authentication with using a card number (the first authentication information) is successful, it is determined whether the printed page counter reaches the limit number of print pages, and if it is determined that the printed page counter does not reach the limit number of print pages, the apparatus is set to be in the print allowable state immediately. However, in the sixth illustrative aspect, even if it is determined that the printed page counter does not reach the limit number of print pages, the apparatus is not set to be in the print allowable state immediately. After confirming that no inconsistency occurs between the user management table (1) and the user management table (2), the apparatus is set to be in the print allowable state.

In execution of the authentication using a card number (the first authentication information) by the external management server 31, inconsistency may occur between the user management table (1) stored in the multifunctional apparatus 1 and the user management table (2) stored in the management server 31. For example, although one user ID is registered in the user management table (1) of the multifunctional apparatus 1, the user ID may not be registered in the user management table (2) of the management server 31. In some cases, printing operation may be preferably prohibited for the user ID that causes inconsistency between the user management table (1) and the user management table (2).

According to the sixth illustrative aspect, in such a case, even if the printed page counter does not each the limit number of print pages, the apparatus is not set to be in the print allowable state immediately and the matching of a user is executed. If the matching is successful, the printing operation is allowed to be executed and if the matching is failed, the printing operation is prohibited.

A flow of the user authentication process of the sixth illustrative aspect will be explained with reference to FIG. 21. The same symbols and numbers are provided to the processes that are substantially similar to those of the fourth illustrative aspect and the processes will not be explained.

At step 1301, the control section 11 reads from the user management table (1) the user ID corresponding to the card number output from the card reader 16 and transmits the read user ID (an example of user identifier information) to the management server 31 and request the matching (an example of the matching process).

If receiving the user ID from the multifunctional apparatus 1, the management server 31 executes the matching process for matching the user ID and returns the matching result to the multifunctional apparatus 1. The matching process executed by the management server 31 will be described in detail later.

At step S1302, the control section 11 determines whether the matching result received from the server is successful. If the matching result is successful, the process proceeds to step S209 and if the matching result is failed, the process proceeds to step S1303 (an example of a third print control process).

At step S1303, the control section 11 displays on the display 14*a* a message indicating that the matching is failed and terminates the process.

A flow of the matching process executed by the management server 31 will be explained with reference to FIG. 22.

At step S1401, the management server 31 executes the matching of a user with using the user ID received from the multifunctional apparatus 1. Specifically, the management server 31 determines whether the user ID received from the multifunctional apparatus 1 is registered in the user management table (2).

If determining that the user ID is registered in the user management table (2) at step s1401, the management server 31 determines that the matching is successful at step S1402 and the process proceeds to step S1403. If determining that the user ID is not registered in the user management table (2), the management server 31 determines that the matching is failed and the process proceeds to step S1404.

At step S1403, the management server transmits the matching result representing that the matching is successful to the multifunctional apparatus 1.

At step 1404, the management server transmits the matching result representing that the matching is failed to the multifunctional apparatus 1.

According to the multifunctional apparatus 1 of the sixth illustrative aspect, after the authentication with using a card number (the first authentication information) is successful, it is determined whether the printed page counter reaches the limit number of print pages. If it is determined that the printed page counter does not reach the limit number of print pages, the multifunctional apparatus 1 is not set to be in the print allowable state immediately and the user ID is transmitted to the management server 31 to execute matching. If the matching is failed, the printing operation is not allowed. Therefore, the printing operation is not allowed for the user whose user ID is registered in the user management table (1) but not registered in the user management table (2).

<Seventh Illustrative Aspect>

Figure 23:
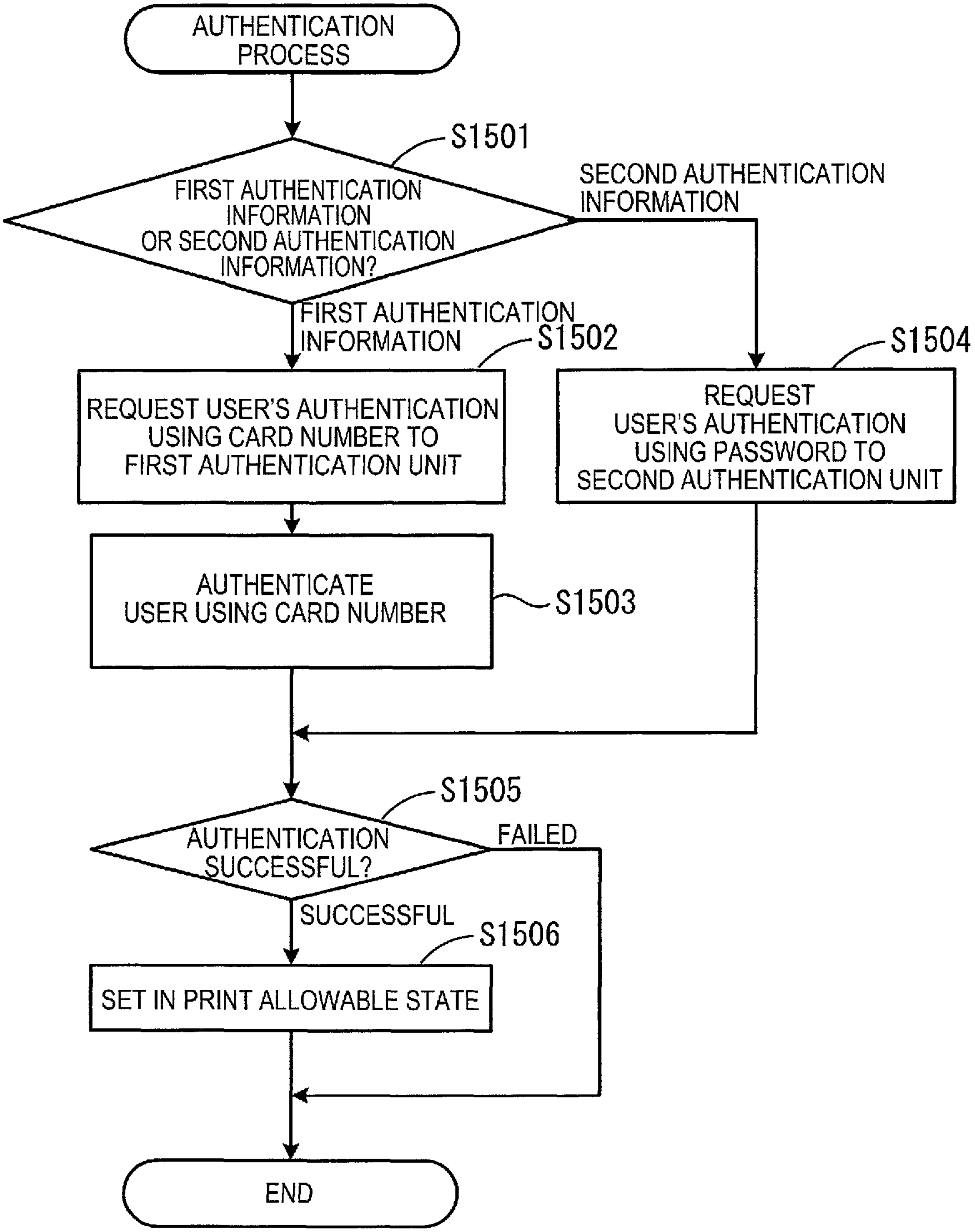
FIG. 23 is a flowchart illustrating a flow of authentication process according to a seventh illustrative aspect.

A seventh illustrative aspect will be explained with reference to FIG. 23.

In the printing process of the first to sixth illustrative aspects, after the authentication with using a card number (the first authentication information) is determined to be successful, it is determined whether the authentication information request condition is satisfied, and if it is determined that the authentication information request condition is satisfied, the authentication with using a password (the second authentication information) is executed. In the seventh illustrative aspect, a user only inputs one of a card number and a password. A user selectively inputs a card number or a password. If the authentication with using the input one of a card number and a password is determined to be successful, the printing operation is allowed to be executed, and if the authentication is determined to be failed, the printing operation is prohibited.

According to the seventh illustrative aspect, card numbers are registered in the multifunctional apparatus 1 and passwords are not registered in the multifunctional apparatus 1. Also, according to the seventh illustrative aspect, card numbers are not registered in the management server and passwords are registered in the management server.

A flow of the authentication process of the seventh illustrative aspect will be explained with reference to FIG. 23. This process is started if a user inputs one of a card number and a password.

At step S1501, the control section 11 determines which one of a card number (the first authentication information) and a password (the second authentication information) is input, and if the control section 11 determines that a card number is input, the process proceeds to step S1502 and if the control section 11 determines that a password is input, the process proceeds to step S1503.

At step S1502, the control section 11 requests the first authentication section to authenticate a user who uses the card number (the first authentication information). In the present illustrative aspect, the control section 11 is an example of the first authentication unit. Namely, if a card number (the first authentication information) is input, the control section 11 itself authenticates a user.

At step S1503, the control section 11 authenticates a user with using the card number (the first authentication information). Specifically, if determining that the card number is registered in the multifunctional apparatus 1, the control section 11 determines that the authentication is successful, and if determining that the card number is not registered in the multifunctional apparatus 1, the control section 11 determines that the authentication is failed.

At step S1504, the control section 11 transmits the input password (the second authentication information) to the management server of the seventh illustrative aspect (an example of the second authentication unit) to request to authenticate the user.

If receiving a password from the multifunctional apparatus 1, the management server of the seventh illustrative aspect determines whether the password is registered in the management server, and if determining that the password is registered in the management server, the management server returns an authentication result representing that the authentication is successful to the multifunctional apparatus 1 and if determining that the password is not registered in the management server, the management server returns an authentication result representing that the authentication is failed to the multifunctional apparatus 1.

At step S1505, the control section 11 determines whether the authentication made at step S1503 is successful or whether the authentication result received from the management server is successful. If the control section 11 determines that the authentication is successful at step S1505, the process proceeds to step S1506 and if the control section 11 determines that the authentication is failed, the user authentication process is terminated.

At step S1506, the control section 11 sets the multifunctional apparatus 1 in the print allowable state. If determining that the authentication is failed at step S1505, the process of step S1506 is not executed and in such a case, the multifunctional apparatus 1 is kept in the print prohibited state.

In the seventh illustrative aspect, the processes of steps S1501 to S1504 are an example of the authentication request process and the processes of steps S1505 to S1506 are an example of the print control process.

Advantageous effects of the seventh illustrative aspect will be explained. For example, ID cards are not necessarily provided to all users and some users may have only passwords. In such a case, the multifunctional apparatus 1 storing only card numbers cannot authenticate a user. In such a case, an external management server storing passwords can authenticate a user if a password is input and the input password is transmitted to the external management server to request the authentication.

In other words, if a card number is input, it is effective that the multifunctional apparatus 1 authenticates a user and if a password is input, it is effective that the external management server authenticates a user.

According to the seventh illustrative aspect, if a card number is input, the multifunctional apparatus 1 authenticates a user, and if a password is input, the input password is transmitted to an external management server to request the authentication. Therefore, the authentication is executed by an appropriate device according to the input authentication information.

<Other Illustrative Aspects>

The scope of the present invention is not limited to the illustrative aspects described above with reference to the drawings. The following illustrative aspects may be included in the technical scope of the present invention.

(1) In the above illustrative aspects, the user authentication is executed with using an ID card 19. However, a password that is different from the second authentication information may be used as the first authentication information without using any portable recording medium such as an ID card 19.

In the above illustrative aspects, a first authentication is executed with using an ID card 19 and if the printed page counter reaches the limit number of print pages, the authentication is executed with using a password. The authentication information used for the authentication may be other type of information as long as the information includes at least two different types of information. For example, the information may be fingerprint for fingerprint authentication, biometric information for biometric authentication, retina for retina authentication and other information.

(2) In the above illustrative aspects, even if the authentication with using a card number is successful, a print instruction for execution of printing is made only once. However, the print instructions may be made repeatedly until a user cancels the authentication.

In the first illustrative aspect, an ID card 19 is passed over the card reader 16 such that a card number is read by the card reader 16. However, an ID card 19 may be inserted to a card slot provided in the card reader 16 such that a card number is read by the card reader 16. Print instructions may be repeatedly made until the ID card 19 is removed from the card reader 16. In such a case, if the ID card 19 is removed from the card reader 16, the authentication cancel condition is satisfied.

(3) In the above illustrative aspects, if the authentication with using a password (the second authentication information) is successful, the printed page counter is reset to be zero. The printed page counter is not necessarily reset to be zero but a predetermined value may be reduced from the printed page counter.

Instead of reducing a predetermined value from the printed page counter, a predetermined value may be added to the limit number of print pages to set the value of the printed page counter relatively smaller than the limit number of print pages.

(4) In the above illustrative aspects, a predetermined value is forcibly added to the printed page counter at predetermined time intervals in the increasing process for forcibly increasing a number of print pages. However, instead of forcibly adding a predetermined value to the printed page counter, a predetermined value may be subtracted from the limit number of print pages to decrease difference between the value of the printed page counter and the limit number of print pages.

(5) In the above illustrative aspects, a predetermined value is forcibly added to the printed page counter at predetermined time intervals in the increasing process for forcibly increasing a number of print pages. However, the value of the printed page counter may be increased to be a value equal to the limit number of print pages or greater (a value equal to the limit number of print pages or greater) after a predetermine time passes. The value equal to the limit number of print pages or greater is an example of a value that reaches a limit value.

(6) In the second illustrative aspect, if the printed page counter reaches the limit number of print pages, a user can select one of the password authentication and the fingerprint authentication. A user can select one of or both of the password authentication and the fingerprint authentication.

As the number of the second authentication information used for the authentication is smaller, the user may have low reliability. Therefore, if a user selects one of the password authentication and the fingerprint authentication, difference between the value of the printed page counter and the limit number of print pages may be smaller compared to a case in which both of the password authentication and the fingerprint authentication are selected. In other words, as the number of authentication information used for the authentication is smaller, the difference between the value of the printed page counter and the limit number of print pages can be smaller.

For example, if the password authentication is selected, fifty may be subtracted from the value of the printed page counter, and if the fingerprint authentication is selected, a hundred may be subtracted from the value of the printed page counter, and if both of the password authentication and the fingerprint authentication are selected, one hundred and fifty may be subtracted from the value of the printed page counter.

Accordingly, a user executes authentication with using a plurality types of authentication information such that the difference between the printed page counter and the limit print pages becomes greater, that is, such that printing operations on the great number of pages of recording medium are allowed. This improves reliability of the authentication.

(7) In the above illustrative aspects, if the printed page counter reaches the limit number of pages during printing of the print data, the printing operation is interrupted and input of a password is requested. However, a total number of pages of recording medium that are to be used for printing of print data that is to be printed and the value of the user's printed page counter immediately before the printing of the print data (an example of an accumulated amount of used print resources) is greater than the limit number of print pages, the print data may not be printed, that is, the printing operation may not be started, and input of a password may be requested (an example of a second request condition determination process and a third print control process). Accordingly, the printing operation that has been started is not interrupted and this improves convenience of an authenticated user.

However, in case of using the copying function, it is not known how many pages the draft includes before actually starting the printing, and therefore, if the printed page counter reaches the limit number of print pages, the printing will be interrupted.

(8) In the above illustrative aspects, recording medium is used as an example of print resources. However, print resources are not limited to recording medium but may be coloring agents such as toner or ink.

(9) In the above illustrative aspects, the user management table is stored in the storing section 15 of the multifunctional apparatus 1. However, the user management table may be stored in an external computer (for example, a file server).

(10) In the above illustrative aspects, the control section 11 executes each process. However, each of the processes may be executed by a separate CPU, an ASIC or other circuit.

(11) In the above illustrative aspects, if the authentication with using a card number (the first authentication information) is successful in the user authentication process, it is determined whether the authentication information request condition is satisfied. If it is determined that the authentication information request condition is satisfied, input of a password (the second authentication information) is requested. However, it may not be determined whether the authentication information request condition is satisfied in the user authentication process. In other words, it is determined whether the authentication information request condition is satisfied only in the printing process.

(12) In the above illustrative aspects, every time when an image is printed by the printing section 12, the number of recording medium used for the printing is added to a user's printed page counter (an example of an accumulated use amount of print resources). If a value of the printed page counter reaches a limit number of print pages, the authentication information request condition is satisfied. Also, if a user who has not been authenticated by the first authentication process is authenticated by the first authentication process, the authentication information request condition is satisfied. However, the authentication information request condition is not limited thereto.

For example, the number of execution of the authentication by the first authentication process (S201) is counted for every user and if the number of execution of the authentication reaches a predetermined limit number, it may be determined that the authentication information request condition is satisfied. In such a case, a limit number of authentication times may be registered in the user management table instead of the limit number of print pages and a number of authentication times counter may be registered in the user management table instead of the printed page counter.

Passing time after the last successful authentication by the second authentication process (last authentication time) may be counted for every user and if the passing time reaches limit print time, it may be determined that the authentication request condition is satisfied. In such a case, the last authentication time is subtracted from current time such that the passing time after the last successful authentication with using a password is counted.

(13) In the seventh illustrative aspect, if a card number is input, the multifunctional apparatus 1 executes the authentication with using the card number. However, if a card number is input, the card number may be transmitted to a management server that is separately provided from the management server that requests authentication when a password is input, and the authentication may be requested.

If a password is input, the password may be transmitted in the order from the multifunctional apparatus 1, the multifunctional apparatus management server 42 and the user authentication server 43 to execute authentication, as is in the fifth illustrative aspect.

(14) In the above illustrative aspects, every time that an image is printed by the printing section 12, the number of recording medium used for the printing is added to the user's printed page counter. If the value of the printed page counter reaches the limit number of print pages, it is determined that the authentication information request condition for requesting a user to input the second authentication information is satisfied. However, every time that an image is printed by the printing section 12, the number of recording medium for the printing may be subtracted from the user's printed page counter. If a value of the printed page counter reaches zero, it may be determined that the authentication information request condition for requesting a user to input the second authentication information is satisfied.

For example, recording medium is used as the print resource, the limit number of print pages is registered in the printed page counter of the user management table, and thereafter, the printed number of pages may be subtracted from the printed page counter. In such a case, a field for storing the limit number of print pages may not be provided in the user management table. Similar processes may be executed for the process with the number of authentication times using the first authentication information and the process with the passing time after the last authentication using the second authentication information.

What is claimed is:

1. A printing apparatus comprising:

a printing unit configured to print an image;

an input request unit configured to request inputting of authentication information;

an input reception unit configured to receive authentication information;

a storage unit configured to store first authentication information and second authentication information associated with a first user, the first authentication information associated with the second authentication information;

a controller configured to:

execute a first authentication process, the first authentication process including granting a first usage right based on receipt of authentication information matching the first authentication information, the first authentication information associated with a usage monitor and a limit value on the usage right;

execute a first print control process to allow the printing unit to execute a printing operation according to the first usage right and based on successful authentication in the first authentication process until determining that the authentication cancel condition is satisfied, and to prohibit the printing unit from executing the printing operation according to a failed authentication in the first authentication process;

execute a first request condition determination process to determine whether an authentication request condition is satisfied, the authentication request condition requesting input of the second authentication information;

execute a second authentication process according to a determination that the authentication information request condition is satisfied in the first request condition determination process, the second authentication process including granting a second usage right based on receipt of authentication information matching the second authentication information;

execute a second print control process to allow the printing unit to execute a printing operation according to the second usage right in a case that the second authentication of the user identifier information is successful and prohibit the printing unit from executing a printing operation in a case that the second authentication of the user identifier information is failed;

wherein execution of the second print control process to grant the second usage right adjusts at least one of the usage monitor and the limit value.

2. The printing apparatus according to claim 1, wherein:

the first authentication information is stored in a portable storing medium; and the input reception unit reads the first authentication information from the portable storing medium.

3. The printing apparatus according to claim 1, wherein the controller is further configured to:

execute a second request condition determination process to determine whether the authentication information request condition will be satisfied during the printing operation of an image data that is to be printed suppose that the image data is started to be printed, the second request condition determination process being executed before printing the image data; and execute a third print control process to prohibit the printing unit from printing the image data that is to be printed according to determination by the second request condition determination process that the authentication information request condition will be satisfied during the printing operation of the image data, and control the input request unit to request the particular user to input the second authentication information.

4. The printing apparatus according to claim 1, wherein the controller is further configured to, in the second print control process, according to the successful authentication in the second authentication process, set the value counted in the counting process for the particular user to be relatively smaller than the limit value.

5. The printing apparatus according to claim 1, wherein the controller is further configured to:

execute a time passing determination process to determine whether one of two conditions is satisfied, the two conditions including: a first condition that a first predetermined time elapses from last authentication by the first authentication process, and a second condition that a second predetermined time elapses from last authentication by the second authentication process; and execute a count value changing process to forcibly change a value counted in the counting process to the limit value for each user, in response to determining that one of the two conditions is satisfied.

6. The printing apparatus according to claim 1, wherein the controller is further configured to execute a count value changing process to decrease a difference between a value counted in the counting process and the limit value at one of timing including a first timing that every predetermined time elapses from last authentication by the first authentication process and a second timing that every predetermined time elapses from last authentication by the second authentication process.

7. The printing apparatus according to claim 1, wherein:

the input reception unit is further configured to receive a plurality of kinds of second authentication information;

the controller is further configured to authenticate the particular user with one of the plurality kinds of second authentication information that is received by the input reception unit in the second authentication process and decrease a difference between the value counted in the counting process and the limit value in the second print control process as a number of kinds of the second authentication information used in the second authentication process is smaller.

8. The printing apparatus according to claim 1, wherein:

the second authentication information includes one second authentication information and another second authentication information having a security level lower than the one second authentication information; and the controller is configured to decrease a difference between the value counted in the counting process and the limit value such that the difference is smaller in a case of reception of input of the another second authentication information by the input reception unit than in a case of reception of input of the one second authentication information by the input reception unit.

9. The printing apparatus according to claim 1, wherein the controller is further configured to execute a forcibly changing process to forcibly change one of the value counted in the counting process and the limit value.

10. The printing apparatus according to claim 1, wherein the controller is further configured to:

determine whether the particular user who is authenticated in the first authentication process has been authenticated before in the first authentication process; and determine in the first request condition determination process that the authentication information request condition is satisfied in response to determining that the particular user who has never been authenticated before in the first authentication process is authenticated in the first authentication process.

11. The printing apparatus according to claim 1, wherein the first authentication process includes:

controlling the input request unit to request inputting authentication information;

controlling the input reception unit to receive the authentication information;

determining that the first authentication process is successful in a case that the first authentication information which is identical to the authentication information received by the input reception unit is stored in the storage unit;

determining that the first authentication is failed in a case that the first authentication information which is identical to the authentication information received by the input reception unit is not stored in the storage unit; and determining whether an authentication cancel condition for canceling authentication of the first authentication process is satisfied.

12. The printing apparatus according to claim 11, wherein the second authentication process includes:

controlling the input request unit to request inputting authentication information;

controlling the input reception unit to receive the authentication information;

receiving the second authentication information associated with the first authentication information from the storage unit;

determining whether the second authentication information retrieved from the storage unit is identical to the authentication information received by the input reception unit;

determining that the second authentication is successful in a case that the second authentication information retrieved from the storage unit is identical to the authentication information received by the input reception unit; and determining that the second authentication is failed in a case that the second authentication information retrieved from the storage unit is different to the authentication information retrieved from the storage unit is different to the authentication information received by the input reception unit.

13. The printing apparatus according to claim 1, wherein the limit value comprises a page limit and the usage monitor comprises a page count.

14. A printing apparatus configured to establish mutual communication with a management server, the printing apparatus comprising:

a printing unit configured to print an image;

an input request unit configured to request inputting of authentication information;

an input reception unit configured to receive input of the authentication information;

a first storage unit configured to store user identifier information and first authentication information, the user identifier information associated with the first authentication information; and a first controller;

the management server comprising:

a second storage unit configured to store the user identifier information and second authentication information, the user identifier information associated with the second authentication information; and a second controller configured to:

in a case that the management server receives user identifier information and authentication information from the printing apparatus, determine whether a combination of the user identifier information and the authentication information received from the printing apparatus is stored in the second storage unit; and respond to the printing apparatus that the authentication is failed in a case that combination of the user identifier information and the authentication information received from the printing apparatus is not stored in the second storage unit;

wherein the first controller disposed in the printing apparatus is configured to:

execute a first authentication process, the first authentication process including granting a first usage right based on receipt of authentication information matching the first authentication information, the first authentication information associated with a usage monitor and a limit value on the usage right;

control the input request unit to request inputting authentication information;

control the input reception unit to receive the authentication information;

determine whether the first authentication information which is identical to the authentication information received by the input reception unit is stored in the first storage unit;

determine that the first authentication is successful in a case that the first authentication information which is identical to the authentication information received by the input reception unit is stored in the first storage unit; and determine that the first authentication is failed in a case that the first authentication information which is identical to the authentication information received by the input reception unit is not stored in the first storage unit;

determine whether an authentication cancel condition for canceling authentication of the first authentication information is satisfied;

execute a first print control process to allow the printing unit to execute a printing operation according to the first usage right and based on successful authentication of the first authentication information in the first authentication process until determining that the authentication cancel condition is satisfied, and to prohibit the printing section from executing the printing operation according to a failed authentication of the first authentication information in the first authentication process;

execute a first request condition determination process to determine whether an authentication request condition is satisfied, the predetermined authentication request condition requesting input of the second authentication information to the user information that is authenticated in the first authentication process and for the user information which is determined that the authentication cancel condition is not satisfied;

execute a second authentication process according to determination that the authentication information request condition is satisfied in the first request condition determination process, the second authentication process including:

controlling the input request unit to request inputting the second authentication information;

controlling the input reception unit to receive the second authentication information;

retrieving, from the first storage unit, the user identifier information associated with the first authentication information;

transmitting the user identifier information retrieved from the first storage unit and the second authentication information received by the input reception unit to the management server to request authentication;

receiving an authentication result according to the user identifier information and the second authentication information from the management server; and granting a second usage right based on receipt of authentication information matching the second authentication information; and execute a second print control process to allow the printing unit to execute a printing operation according to the second usage right and based on reception of a successful authentication result from the management server and prohibit the printing unit from executing a printing operation according to reception of a failed authentication result from the management server;

wherein execution of the second print control process to grant the second usage right adjusts at least one of the usage monitor and the limit value.

15. The printing apparatus according to claim 14, wherein the controller is further configured to execute:

a matching process to execute the first request condition determination process according to the successful user authentication in the first authentication process and determine whether the authentication information request condition is satisfied, and according to determination that the authentication information request condition is not satisfied, transmit user identifier information for identifying the particular user to the management server to request matching of the particular user and receive a matching result from the management server; and execute a third print control process to allow the printing unit to execute a printing operation according to reception of a successful matching result from the management server and prohibit the printing unit from executing a printing operation according to reception of a failed matching result from the management server.

16. A printing apparatus configured to establish mutual communication with an external apparatus, the printing apparatus comprising:

a printing unit configured to print an image;

a first storage unit configured to store first authentication information associated with a user;

an input request unit configured to request inputting of authentication information;

a first input reception unit configured to receive input of authentication information;

a second input reception unit configured to receive input of authentication information;

a first authentication unit configured to:

in a case that authentication information received from the first input reception unit is identical to the first authentication information stored in the first storage unit, determine that authentication is successful; and in a case that authentication information received from the first input reception unit is different from the first authentication information stored in the first storage unit, determine that authentication is failed; and a controller;

the external apparatus comprising:

a second storage unit configured to store second authentication information associated with the user; and a second authentication unit configured to:

in a case that authentication information received from the printing apparatus is identical to the second authentication information stored in the second storage unit, respond that authentication is successful to the printing apparatus; and in a case that authentication information received from the printing apparatus is different from to the second authentication information stored in the second storage unit, respond that authentication is failed to the printing apparatus wherein the controller of the printing apparatus is configured to:

in a case that the first input reception unit receives authentication information, execute a first authentication process including:

authenticating the authentication information received by the first input reception unit, by using the first authentication unit and granting a first usage right based on receipt of authentication information matching the first authentication information, the first authentication information associated with a usage monitor and a limit value on the usage right;

in a case that the second input reception unit receives authentication information, execute a second authentication process including:

transmitting the authentication information received by the second authentication reception unit to the external device and receiving an authentication result from the external device; and granting a second usage right based on receipt of authentication information matching the second authentication information; and execute a print control process in accordance with at least one of the first usage right and the second usage right, in case of successful authentication in response to the request by the authentication request process, that allows the printing unit to execute a printing operation, and in case of failed authentication in response to the request by the authentication request process, prohibits the printing unit from executing a printing operation;

wherein execution of the second print control process to grant the second usage right adjusts at least one of the usage monitor and the limit value.

* * * * *